United States Patent [19]
Uchiyama et al.

[11] 3,777,839
[45] Dec. 11, 1973

[54] HYDRAULIC-POWER CONTROL DEVICE FOR POWER-ASSISTED STEERING SYSTEM

[75] Inventors: Hiromichi Uchiyama, Tokyo; Naohiko Inque, Yokohama, both of Japan

[73] Assignee: Nissan Motor Company, Limited, Yokohama City, Japan

[22] Filed: Dec. 22, 1971

[21] Appl. No.: 210,809

[30] Foreign Application Priority Data
Dec. 29, 1970 Japan.............................. 45/120692
Dec. 29, 1970 Japan.............................. 45/120693
Mar. 16, 1971 Japan.............................. 46/14288
Mar. 16, 1971 Japan.............................. 46/14504
Mar. 17, 1971 Japan.............................. 46/14589

[52] U.S. Cl............................. 180/79.2 R, 91/434
[51] Int. Cl.............................................. B62d 5/08
[58] Field of Search................. 180/79.2 R; 60/525; 91/370, 371, 372, 373, 434

[56] References Cited
UNITED STATES PATENTS

| | | | |
|---|---|---|---|
| 2,893,504 | 7/1959 | Jackson.......................... | 180/79.2 R |
| 2,746,557 | 5/1956 | Augustin........................ | 180/79.2 R |
| 2,748,881 | 6/1956 | Holley............................ | 180/79.2 R |
| 3,085,645 | 4/1963 | Bookout et al. ................ | 180/79.2 R |
| 3,465,842 | 9/1969 | Hruska........................... | 180/79.2 R |

*Primary Examiner*—Kenneth H. Betts
*Assistant Examiner*—Leslie J. Paperner
*Attorney*—John Lezdey

[57] ABSTRACT

Herein disclosed is a hydraulic-power control device of a servo mechanism for automotive power-assisted steering systems. The control device includes a booster unit by which the working fluid pressure to be directed to the reaction chamber of the servo mechanism is multiplied depending upon several ranges of the vehicle driving speed so as to provide effortless steering performance during relatively low-speed driving and stabilized steering performance during relatively high-speed driving especially under the straight-ahead condition of the steering system.

29 Claims, 13 Drawing Figures

HYDRAULIC-POWER CONTROL DEVICE FOR POWER-ASSISTED STEERING SYSTEM

The present invention relates generally to steering systems of motor vehicles and has a particular reference to a hydraulic-power control device for use in automotive power-assisted steering systems.

A majority of the modern motor vehicles are equipped with power-assisted steering systems for the purpose of lessening the physical effort required on the driver in operating the steering, so as to relieve the driver from fatigue and to enable him to softly and efficiently steer the vehicle especially when parking at a curb or when the traffic is congested. To add to the steering assistance, most of the power-assisted steering systems incorporate hydraulic servo mechanisms by which the hydraulic power available in the systems is reinforced or multiplied. Such servo mechanisms are required, in addition to their inherent performances, to provide the vehicle driver a "feel of the road" or reaction from the steered front wheels and to enable him to perceive at the steering wheel the tendency of the vehicle to straighten out from a turn of the front tires. During driving of the motor vehicles at relatively high speeds, moreover, it is important that the reaction be augmented and stabilized to assure safety of driving. The servo mechanisms are thus provided with hydraulic reaction chambers by which the force resulting from the hydraulic power for the steering is returned to the steering wheel and control devices by which the hydraulic power entering the reaction chambers is varied in accordance with the vehicle driving speeds. A typical example of such control devices includes a steering-control valve which is adapted to respond to steering resistance and control the pressure of the fluid from an engine driven pump in accordance with the steering resistance and a speed-sensitive control unit which is adapted to produce an electric signal representing the vehicle driving speed. The fluid pressure which has been controlled by the steering-control valve is thus further controlled in accordance with the vehicle speed before it is directed to the hydraulic reaction chamber. When, for instance, the vehicle is being driven at a relatively high speed and a relatively great steering resistance is encountered in the steering system, then the fluid pressure is controlled to develop a relatively high hydraulic pressure and vice versa. The fluid pressure to be directed to the reaction chamber is, therefore, not only varied with the steering resistance but regulated in a manner to require more physical effort applied to the steering wheel during high-speed cruising and less physical effort during low-speed driving.

Limitations are, however, encountered in the performances of the prior art hydraulic servo mechanisms of the above outlined nature. Foremost of such limitations is the fact that the fluid pressure to be directed to the hydraulic reaction chamber can not exceed the level of the pressure of the fluid primarily controlled by the steering-control valve. This invites lack of stability in steering operations because only limited reactions are imparted to the steering wheel especially during high-speed driving. Another limitation results from the fact that the power assistance achieved by the fluid pressure of the pump delivery as controlled by the steering-control valve is practically negligible when no, or only slight, physical effort is applied to the steering wheel as during normal, straight-highway driving, although such steering-assistance fluid pressure rises as the steering resistance increases. This, again, results in lack of stability during high-speed driving on a straight road.

These limitations will be more or less raised if the pressure acting areas in the hydraulic reaction chamber are considerably expanded as practised in the conventional art. This, however, is reflected by the disproportionately large-sized construction of the reaction chamber and, as such, has not been fully accepted especially in the steering servo mechanisms of the integral type in which the hydraulic reaction chamber and steering-control valve are combined integrally with a steering power cylinder. The increased pressure acting areas in the reaction chamber further creates a difficulty in that an unduely high fluid pressure is produced by the steering-control valve at the initial stage of the steering operation. A considerably increased physical effort should therefore be exerted on the steering wheel during low- and intermediate-speed driving, so that the intent of the power-assisted steering is almost jeopardized. Driver's feeling of uncomfortableness at a transitional moment from the manual (or unassisted) to assisted conditions may also be pointed out.

The present invention contemplates provision of an improved hydraulic-power control device for use in the power-assisted steering system having the reaction chamber whereby the above noted drawbacks inherent in the prior art counterparts are eliminated.

It is, therefore, an object of the present invention to provide an improved hydraulic-power control device which is adapted to make steering more effortless and reliable under various driving conditions of the motor vehicle.

It is another object of the invention to provide an improved hydraulic-power control device providing ease and reliability of power-assisted steering for parking or during congested traffic conditions and for high-speed driving of the motor vehicle.

It is still another object of the invention to provide an improved hydraulic-power control device by which proper reactions are imparted to the steering wheel under any driving condition of the motor vehicle so as to enable the driver to steer the vehicle with sufficient stability.

It is still another object of the invention to provide an improved hydraulic-power control device which is capable of supplying to the reaction chamber a fluid pressure which may be higher, under predetermined conditions, than the fluid pressure developed to provide the steering-assistance power.

It is still another object of the invention to provide an improved hydraulic-power control device by which completely stabilized power-assisted steering is achieved even during straight-highway driving of the motor vehicle at elevated speeds.

It is still another object of the invention to provide an improved hydraulic-power control device which is adapted to be compatible with the reaction chamber having the construction of usual size. Thus, the device according to the present invention is well compatible with the steering servo mechanisms of the integral type.

It is still another yet important object of the invention to provide a hydraulic-power control device which is operable to boost or multiply an input fluid pressure to practically unlimited, proper levels depending not only upon the steering resistance as encountered in the steering system but upon the speed of the motor vehicle under any driving condition.

It is still another object of the invention to provide an improved hydraulic-power control device having a simple and compact construction which is easy and economical to manufacture on a commercial basis.

These and other objects of the present invention are generally accomplished in a construction comprising a steering-control valve unit which is responsive to steering resistance from front wheels of the motor vehicle and which is hydraulically connected to a constant-delivery pump so that the fluid pressure of the pump delivery is controlled to develop a steering-assistance fluid pressure in accordance with the steering resistance, speed-sensitive control means which is responsive to driving speed of the motor vehicle and producing an electric signal representative of the vehicle driving speed, a pressure control valve unit responsive to the steering-assistance fluid pressure and to the electric signal supplied from the speed-sensitive control means so as to produce a control signal which is related to the steering-assistance fluid pressure and the electric signal, and a booster unit which is hydraulically connected to the pump, reaction chamber and steering-control valve unit for varying a fluid pressure to be directed to the reaction chamber in accordance with the control signal supplied from the pressure control valve unit.

The pressure control valve unit may be connected to the booster and steering-control valve unit either hydraulically or hydromechanically. Where, thus, the pressure control valve unit is hydraulically connected to the booster and steering-control valve unit, it supplies to the booster a signal fluid pressure as the aforementioned control signal in accordance with the steering-assistance fluid pressure and the electric signal supplied from the speed-sensitive control means. In this instance, the booster unit may be constructed in a manner to comprise a balanced valve having opposed, larger and smaller working faces and a pressure-control passageway for providing interruptible fluid communication between the pump and steering-control valve unit through an adjustable flow restriction which is adjustable by movement of the balanced valve due to a difference between the pressures acting upon the working faces thereof. The larger working face of the balanced valve is subjected to the signal fluid pressure supplied from the pressure control valve unit while the smaller working face is subjected to the pressure of the pump delivery. The adjustable flow restriction in the pressure control passageway is constricted or even closed when the balanced valve is moved by the aforesaid signal fluid pressure against the pump delivery pressure acting on the smaller working face of the balanced valve, so as to give rise to an increase in the pump delivery pressure. It is preferable that the booster unit is further provided with a valved passageway leading at one end from a pump side of the pressure-control passageway and opened at the other to the outside so as to drain off the pump delivery when the pump delivery pressure is increased beyond a predetermined level. A similar valved passage way may also be formed in the booster unit, leading at one end from a steering-control valve unit side of the pressure-control passageway and opened at the other to the outside for relieving the steering-assistance fluid pressure as soon as the pressure is increased beyond a predetermined level.

The pressure control valve unit thus supplying the signal fluid pressure to the booster may comprise a first valve member which is operable to cut off the delivery of the steering-assistance fluid pressure from the steering-control valve unit to the booster unit when actuated, a second valve member operable to relieve the steering-assistance fluid pressure at a limited rate when actuated, and first and second electromagnetic actuating means connected to the aforesaid speed-sensitive control means and respectively associated with the first and second valve members for actuating the valve members when energized.

The first electromagnetic actuating means is energized when the electric signal from the speed-sensitive control means is representative of a vehicle driving speed which is lower than a predetermined relatively low level. The second electromagnetic actuating means, on the other hand, is energized when the electric signal from the speed-sensitive control means is indicative of a vehicle driving speed which is higher than a relatively high level. Where the pressure control valve unit is constructed in this manner, it may also comprise a first passageway which is hydraulically connected at one end to the steering-control valve unit through a flow restriction and at the other to the booster unit and a second passageway leading at one end from the first passageway through a flow restriction and opened at the other to the outside. The first and second valve members are respectively positioned in a manner to shut-off the first and second passageways posterior to the associated flow restrictions therein when the valve members are actuated.

Where an arrangement is preferred in which the pressure control valve unit is hydromechanically connected to the booster unit and steering-control valve unit, the pressure control valve unit may be so constructed as to supply to the booster unit a mechanical signal as the above mentioned control signal in accordance with the steering-assistance fluid pressure and the electric signal supplied from the speed-sensitive control means. The booster unit may then comprise first and second balanced valves each having opposed, smaller and larger working faces, a first passageway for providing fluid communication between an input side of the first balanced valve and an output side of the second balanced valve through output and input sides of the first and second balanced valves respectively and a second passageway for providing interruptible fluid communication between the output sides of the first and second balanced valves. The smaller working faces of the first and second balanced valves are subjected to respective input pressures to the valves and the larger working faces are subjected to respective output pressures from the valves. The input pressure to the first balanced valve and the output pressure from the second balanced valve correspond respectively to the pressure of the pump delivery and the steering-assistance fluid pressure. The first passageway is provided with first and second adjustable flow restrictions intervening between the input and output sides of the first and second balanced valves, respectively. These flow restrictions are adjustable by movements respectively of the first and second balanced valves due to differences between the input and output pressures acting upon the respective valves. Each of the output pressures from the first and second balanced valves is thus varied in accordance with the mechanical signal which is supplied by the pressure control valve unit as previously mentioned.

This pressure control valve unit may be made up of first and second electromagnetic actuating means which are adapted to be energized in accordance with the electric signal from the speed-sensitive control means and first and second fluid flow control valves which are operatively connected to the first and second electromagnetic actuating means, respectively, and each of which is actuated when the associated actuating means is energized. The first and second fluid flow control valves are positioned in association with the output sides of the first and second balanced valves of the booster unit so that the second passageway in the unit is controlled by each of the flow control valve thereby to vary each of the output pressures from the first and second balanced valves.

Other features and preferred embodiments of the hydraulic-power control device having the above described general nature will be apparent from the following description taken in conjunction with the accompanying drawings, in which.

Figure 1:
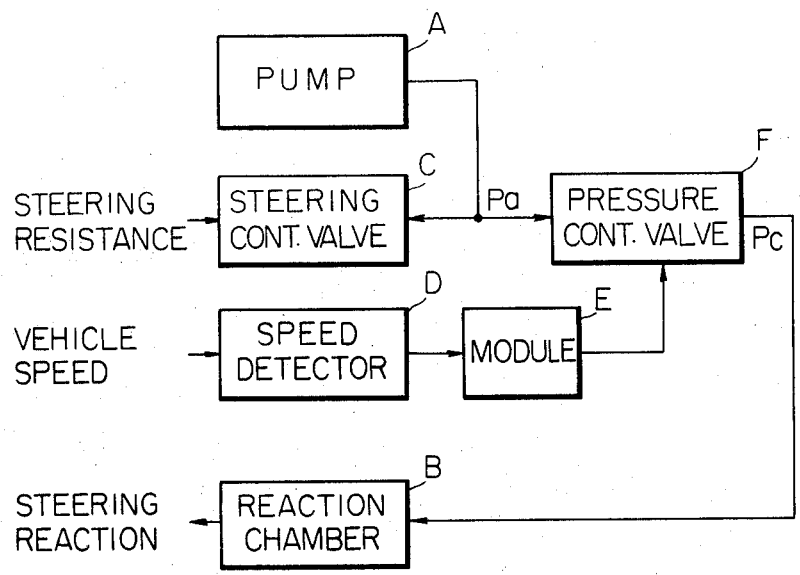
FIG. 1 is a block diagram showing a general construction of a prior art hydraulic-power control device for use with a steering servo mechanism having a hydraulic reaction chamber.

Reference is first made to FIG. 1 to clearly bring out the previously discussed drawbacks of the prior art hydraulic-power control device for the servo mechanisms of the power-assisted steering systems.

As illustrated in FIG. 1, the hydraulic-power control device of prior art hydraulically interconnects a constant delivery pump A (usually driven by a vehicle power plant) and a hydraulic reaction chamber B which forms part of the servo mechanism, not shown. The control device includes a steering-control valve C which is responsive to the steering resistance or load created in the steering system and a vehicle-speed detector D which is responsive to the driving speed of the motor vehicle on which the steering system is installed. The steering-control valve C is connected by a hydraulic line to the constant-delivery pump A and controls the pressure of the pump delivery to develop a steering-assistance fluid pressure Pa. This steering-assistance fluid pressure Pa is directed to a pressure control valve F to which the steering-control valve C is connected by a hydraulic line. The vehicle-speed detector D, on the other hand, produces an electric signal which is generally proportional to the detected vehicle speed and supplies the signal to a module E. This module is constructed to convert and amplify the input signal into an appropriate control signal which is predetermined depending upon desired operation characteristics of the control device. The module F is electrically connected to the pressure control valve E so that the steering-assistance fluid pressure Pa supplied to the control valve is further modified in accordance with the control signal from the module, thereby to develop a finally controlled pressure Pc which is to be directed to the reaction chamber B through a hydraulic line. A reactive force thus developed in the reaction chamber B is returned to the steering wheel so as to provide the driver the feeling of reaction from the steering system. The control device is designed to increase such steering reaction during high-speed driving of the motor vehicle and to decrease the reaction during low-speed driving so as to assure stable and smooth steering operations under various driving conditions of the motor vehicle. In the shown hydraulic-power control device of prior art, however, it is impossible that the fluid pressure Pc delivered from the pressure control valve F and directed to the reaction chamber B is increased beyond the steering-assistance pressure Pa. The fluid pressure Pc only becomes equal to the pressure Pa even when it is increased to a maximum. Moreover, the steering-assistance fluid pressure Pa is kept at an extremely low level when no, or only negligible, steering effort is applied to the steering system such as during straight-highway driving. These result in lack of stability of steering operation especially during high-speed driving of the motor vehicle, as previously pointed out.

Figure 2:
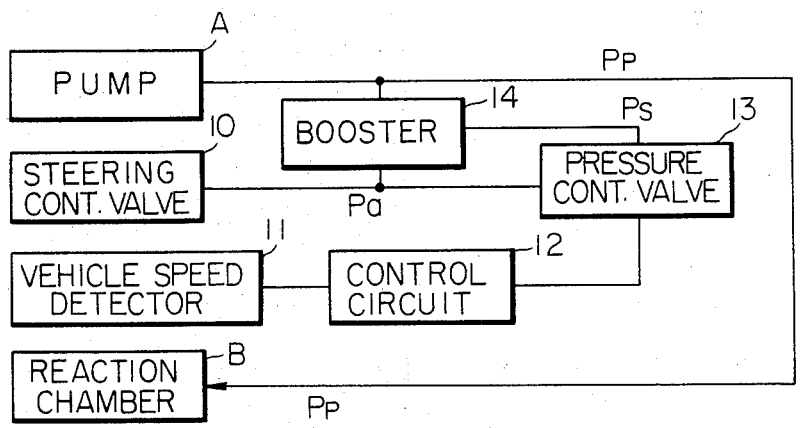
FIG. 2 is a block diagram which schematically illustrates basic construction principle governing various preferred embodiments of the present invention.

A general constructional arrangement of the hydraulic-power control device according to the present invention which is free from the above noted drawbacks is now illustrated in a block form in FIG. 2. Similarly to the prior art hydraulic-power control device shown in FIG. 1, the device according to the invention includes a steering-control valve unit 10, a vehicle speed detector 11, a module or electric control circuit 12, and a pressure control valve unit 13. All these may be constructed in an essentially similar manner to their counter-parts of the device prior art, unless otherwise specified in the description to follow. The steering-control valve unit 10, for instance, may be constructed in a manner to develop a fluid pressure which is generally proportional to the steering resistance appearing in the steering system. The vehicle speed detector 11, on the other hand, may be constructed in a manner to detect the revolution speed of either the vehicle wheel or the propeller shaft so as to produce a signal voltage proportional to the detected revolution speed. The construction of the pressure control valve unit 13 may be such that it has an adjustable orifice with its working area adjusted by a solenoid device which may be energized from the electric control circuit 12 or any other electrically operating speed-sensitive control means.

Different from the device shown in FIG. 1, the hydraulic-power control device according to the present invention is further provided with a booster unit 14 which is adapted to multiply the steering-assistance fluid pressure $P_a$ developed by the steering-control valve unit 10. The booster is hydraulically connected on one side to the constant-delivery pump A and reaction chamber B of the steering servo mechanism, not shown, and on the other side to the steering-control valve unit 10. The pressure control valve unit 13 is either hydraulically or hydromechanically connected on one side to the steering-control valve unit 10 and on the other to the booster unit 14 while being electrically connected to the electric control circuit 12.

Figure 3:
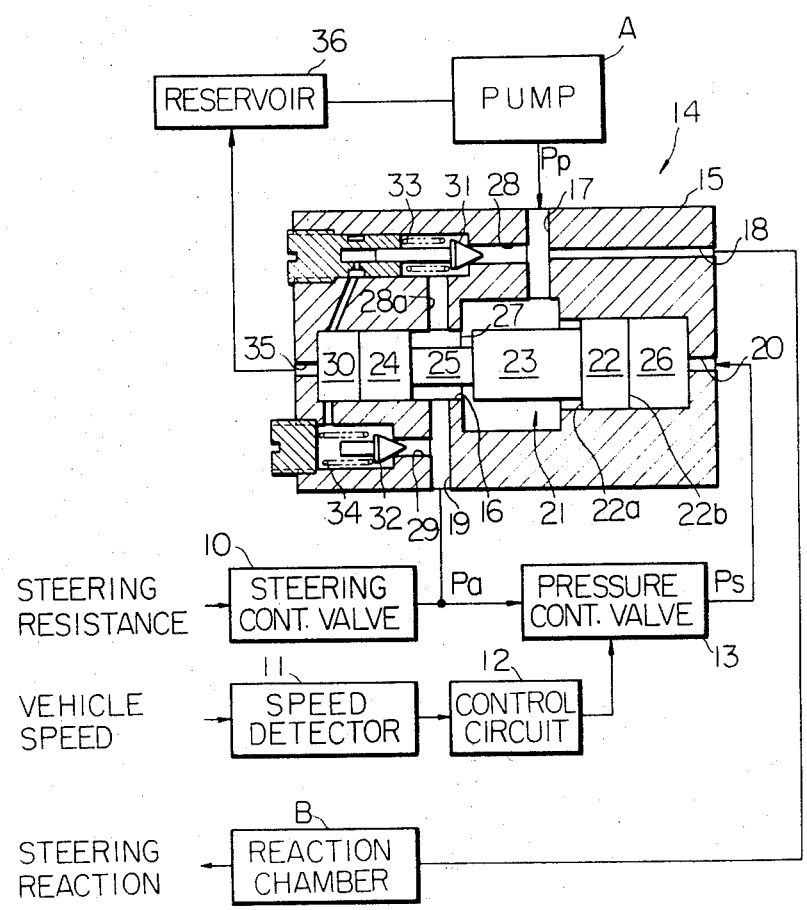
FIG. 3 is a view showing a first preferred embodiment of the device according to the present invention having of the device according to the present invention having a booster unit illustrated by its section and associated means and units shown in a block form.

The detailed construction of the booster unit 14 which forms part of the first preferred embodiment of the hydraulic-power control device according to the present invention is now illustrated in FIG. 3. The booster unit 14 as shown has a housing structure 15 having formed therein a generally cylindrical bore 16. This cylindrical bore 16 communicates with the pump A through an inlet port 17 and with the hydraulic reaction chamber B through an outlet port 18 wich leads from the inlet port 17. The cylindrical bore 16 further communicates with the steering-control valve unit 10 and an input side of the pressure control valve unit 13 through a port 19 and with an output side of the pressure control valve unit 13 through an inlet port 20. Thus, a pump-delivery pressure $P_p$ obtains in the ports 17 and 18, a steering-assistance fluid pressure Pa developed by the steering-control valve unit 10 obtains in the port 19, and a signal fluid pressure Ps developed by the pressure control valve unit 13 obtains in the port 20. A directional balanced valve 21 is axially slidably received in the cylindrical bore 16. This balanced or piston valve 21 has a larger-diameter land 22 formed at one end of the valve adjacent the inlet port 20 and spaced smaller-diameter lands 23 and 24 defining therebetween an annular groove 25. One smaller-diameter land 23 projects from an inner face of the larger-diameter land 22 while the other smaller-diameter land 24 is located at an end of the valve 21 opposite to the larger-diameter land 22. The smaller-diameter lands 23 and 24 have working faces of equal areas so that the fluid pressure acting thereupon results in no mechanical displacement of the valve 21 in its entirety. The larger-diameter land 22, on the other hand, has its inner working face 22a subjected to the pump delivery pressure $P_p$ directed to an input side of the valve 21 through the inlet port 17 and its outer working face 22b subjected to the signal fluid pressure Ps directed into the bore 16 through the inlet port 20 from the pressure control valve unit 13, as illustrated. The outer working face 22b of the land 22 thus defines a signal fluid chamber 26 with an end wall of the cylindrical bore 16. The inner working face 22a is smaller than the outer working face 22b and, as such, they are herein referred to as smaller and larger working faces, respectively, to provide simplicity of definition in the appended claims.

The annular groove 25 defined between the smaller-diameter lands 23 and 24 is on one side in constant communication with the port 19 leading to the steering-control valve unit 10 and on the other side in interruptible communication with the inlet port 17 and accordingly to the outlet port 18 through an adjustable flow restriction or orifice 27 which is defined by cooperating circumferential edges of a stepped portion of the cylindrical bore 16 and the smaller-diameter land 23. The valve 21 is thus axially movable when there is a difference between the pressures acting upon the smaller and larger working faces 22a and 22b, respectively, and rests in a balanced axial position when such pressures are equalized.

In order that the fluid pressures $P_p$ and $P_a$ be prevented from being excessively increased for one reason or another, the booster unit 14 may be further provided with a suitable pressure relief arrangement. For this purpose, bypass passages 28 and 29 are formed in the housing structure 15 in association with the ports 17 and 19, respectively. The bypass passage 28 leads at one end from the inlet port 17 and is opened at the other end to an end portion 30 of the bore 16 while the bypass passage 29 leads at one end from the port 29 and is opened at the other end to the end portion 30 of the bore. The bypass passage 28 communicates with the port 19 through a passage 28a through the bore 16, as shown. Spring-loaded pressure relief valves 31 and 32 are interposed between ends of the bypass passages 28 and 29, respectively, in a manner that each of the valves 31 and 32 is moved to a position to pass the fluid in each of the ports 17 and 19 to the end portion 30 of the bore 16 if and when the pressure of the fluid rises in excess of a predetermined level. These valves 31 and 32 are herein shown as poppet valves which are biased to close the bypass passages 28 and 29 by means of preloaded springs 33 and 34, respectively. The end portion 30 of the bore 16 is opened to the outside or, as illustrated, led to the pump A through a port 35 formed in the housing structure 15 and a reservoir 36 so that the excess fluid passed to the end portion 30 of the bore 16 is returned to the pump. This reservoir 36 may be connected also to the steering-control valve unit 10 and pressure control valve unit 13, where desired, though not shown.

When, in operation, the motor vehicle is driven at an increasing speed and with an increasing steering resistance encountered, then the pressure control valve unit 13 delivers an increasing signal pressure $P_s$. This causes the fluid pressure in the fluid chamber to increase so that the balanced valve 21 is moved away from the port 20 against the pressure $P_p$ acting on the smaller working face 22a of the land 22. The working area of the adjustable orifice 27 is consequently reduced by movement of the intermediate land 23 toward the circumferential edge of the stepped portion of the cylindrical bore 16. If, now, the areas of the smaller and larger working faces 22a and 22b of the larger-diameter land 22 are donoted by $S_p$ and $S_s$, respectively, where $S_p < S_s$, then the balanced valve 21 is moved leftwardly of the drawing by a force represented by ($P_s \times S_s$) overcoming an opposing force represented by ($P_p \times S_p$). The orifice 27 now being constricted by the movement of the balanced valve 21, the flow of the fluid from the port 17 to the port 19 is subjected to an increased resistance so that the pump delivery pressure $P_p$ rises with the consequent increase in the force ($P_p \times S_p$) acting upon the smaller working face 22a of the land 22. The valve 21 is accordingly moved in a reverse direction, viz., toward the port 20 until equilibrium is achieved between the two opposed forces on the smaller and larger working faces of the land 22. Under this condition, the pump delivery pressure $P_p$ is given by an equation:

$$(P_P = S_s / S_p \cdot P_s.$$

This shows that the pump delivery pressure $P_p$ is multiplied to the signal fluid pressure $P_s$ times $S_s/S_p$ which is greater than 1. It is thus noticed that the fluid pressure $P_p$ to be directed to the reaction chamber B is far greater than the pressure which is attained in the prior art hydraulic-power control devices in which the signal fluid pressure $P_s$ in the device according to the present invention is directly fed to the reaction chamber B. If, for instance, the pressure control valve unit 13 is so constructed as to develop pressure $P_s = S_p/S_s \cdot P_a$ during low-speed driving of the motor vehicle and pressure $P_s = P_a$ during high-speed driving, then the pump delivery pressure $P_p$ to be directed to the reaction chamber B will be expressed, for the low-speed driving condition, as: $P_p = (S_s/S_p \cdot P_s = S_s/S_P \cdot S_P/S_s \cdot P_a = P_a$
and, for the high-speed driving condition, as: $P_p = (S_s/S_P \cdot P_S = (S_s/S_P) \cdot P_a$.
From this it is understood that the physical effort on the steering wheel is relieved of the driver as in the case of the prior art power-assisted steering systems during the low-speed driving condition and increased $S_s/S_p$ fold as compared with the case of the prior art steering systems during the high-speed driving condition.

When, now, the pump delivery pressure $P_p$ further rises to such an extent that the difference between the fluid pressures $P_p$ and $P_a$ reaches a predetermined level, the pressure relief valve 31 opens the bypass passage 28 so that the excess fluid pressure is relieved to the reservoir 36 through the port 35, whereby an excessive increase in the steering reaction or application of an overload on the pump P can be avoided. When, on the other hand, the steering-assistance fluid pressure $P_a$ developed by the steering-control valve unit 10 is excessively increased to reach a predetermined level, then the pressure relief valve 32 opens the bypass passage 29 with the result that the excess fluid in the port 19 is admitted to the port 35. The steering-assistance fluid pressure $P_a$ is in this manner maintained under the predetermined level.

Figure 4:
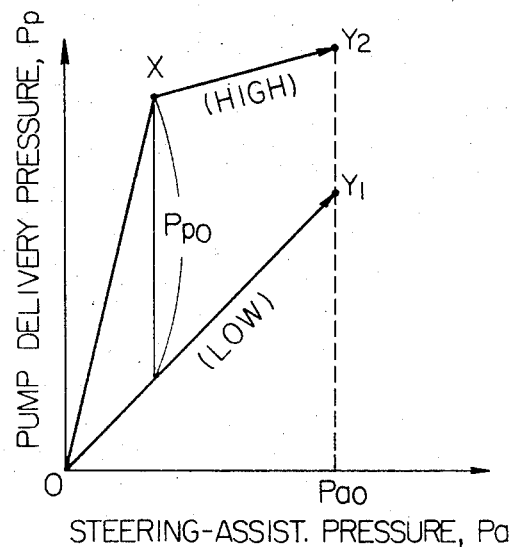
FIG. 4 is a graph showing an example of the variations in the pump delivery pressure in terms of the steering-assistance pressure at two different driving speeds of the motor vehicle as attainable where the device shown in FIG. 3 is placed on use.

FIGS. 4 now indicates an example of the relationships between the steering assistance fluid pressure $P_a$ (on the axis of abscissa) and the pump delivery pressure $P_p$ (on the axis of ordinate) to be directed to the reaction chamber B, as attainable in the hydraulic-power control device shown in FIG. 3. The plot joining points O and $Y_1$ represent such relationship achieved during low-speed driving of the motor vehicle while the plot joining points O, X and $Y_2$ stands for the relationship achieved during high-speed driving. The plot O-$Y_1$ is thus in agreement with the variation in the steering-assistance fluid pressure $P_a$ itself. Under the high-speed driving condition of the motor vehicle, as observed from the plot O-X-$Y_2$, the pump delivery pressure $P_p$ increases abruptly before the steering-assistance fluid pressure $P_a$ reaches a predetermined point as indicated by line segment O-X. Once the point X is reached by the pump delivery pressure $P_p$ so that the difference between the pressure $P_p$ and $P_a$ is $P_{po}$, the increase in the pump delivery pressure $P_p$ slows down as indicated by line segment X-$Y_2$. Where desired, the grade of the line segment X-$Y_2$ may be made zero so that the pump delivery pressure $P_p$ is maintained at level X after the point X has been reached or, otherwise, the line segment X-$Y_2$ may have a grade which is substantially equal to the grade of the plot 0-$Y_1$ for the low-speed driving condition so that the pump delivery pressure $P_p$ is increased at the same rate as the rate of increase of the steering assistance fluid pressure $P_a$. Such characteristics of the pump delivery pressure $P_p$ during the conditions corresponding to the line segment X-$Y_2$ may be determined through selection of the geometry of the bypass passage 28 and pressured relief valve 31 (FIG. 3). If, thus, an arrangement is made so that the pressure acting areas on the input and output sides of the pressure relief valve 31 are denoted by $A_p$ and $A_a$, respectively, then the relation between the values $\Delta P_p$ and $\Delta P_a$ will be given by $$\Delta P_p \times A_p = \Delta P_a \times (A_p - A_a),$$

so that $$\Delta P_p = (A_p - A_a)/A_p \times \Delta P_a.$$

From this it is apparent that the grade of the plot X-$Y_2$ can be varied arbitarily through selection of the geometry of the bypass passage 28 and pressure relief valve 31.

It may be added that the pump delivery pressure $P_p$ is not increased beyond the level $Y_1$ for the low-speed driving condition or the level $Y_2$ for the high-speed driving condition because the steering-assistance fluid pressure $P_a$ can not increase beyond its maximum level $P_{ao}$ at which the pressure relief valve 32 opens the bypass passage 29 to drain off the fluid in the port 19.

Figure 5:
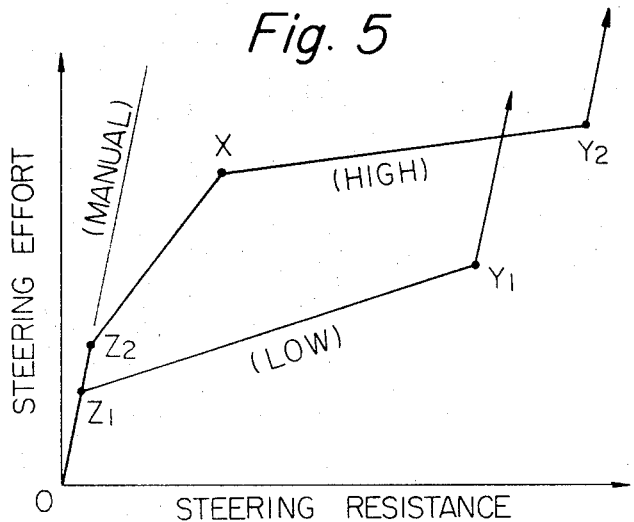
FIG. 5 is a graph showing an example of the relationship between the steering resistance and the steering reaction at two different vehicle driving speeds as attainable by the device shown in FIG. 3.

FIG. 5 illustrates an example of the relationship between the steering resistance (on the axis of abscissa) and the steering reaction (on the axis of ordinate), as attainable by the hydraulic-power control device shown in FIG. 3. The points X, $Y_1$ and $Y_2$ as indicated in FIG. 5 are in agreement with their counterparts in the plots of FIG. 4. Before the steering resistance reaches a certain level, the steering reaction increases at a rate similar to the rate of its increase in the case of the manual or unassisted steering operation, as indicated by the plot O-$Z_1$, for the low-speed driving condition and the plot O-$Z_2$ for the high-speed driving condition. This is because of the fact that, since the steering control valve unit is subject to a certain pressure or preload at an initial stage of the steering operation, the servo mechanism is kept at rest until the steering resistance equals the steering reaction. When, thus, the steering resistance increases and accordingly the servo mechanism becomes operative, steering effort is developed in the reaction chamber so that the power-assisted steering operation is commenced once the physical effort for the manual steering exceeds the effort applied by the reaction chamber. When the steering resistance increases to reach the upper limit $P_{ao}$ of the steering-assistance fluid pressure, then the pump delivery pressure $P_p$ no longer increases and accordingly the steering effort applied by the servo mechanism ceases increasing. If, therefore, the steering resistance still increases, the power-assisted steering effort rises from point $Y_1$ or $Y_2$ at the same rate as in the case of the manual steering operation.

Since, in this instance, the steering-control valve unit is subject to the initial pressure or preload even during the straight-ahead condition of the steering system, the pump delivery pressure $P_p$ increases as the vehicle is driven at an increasing speed. It therefore follows that, during high-speed driving on a straight road, the power-assisted steering effort starts to be applied by the reaction chamber at point $Z_2$ which is higher than point $Z_1$ for the low-speed driving condition. A controlled reaction is in this manner imparted to the steering wheel during straight-highway driving, providing the driver with a feeling of assured steering.

Figure 6:
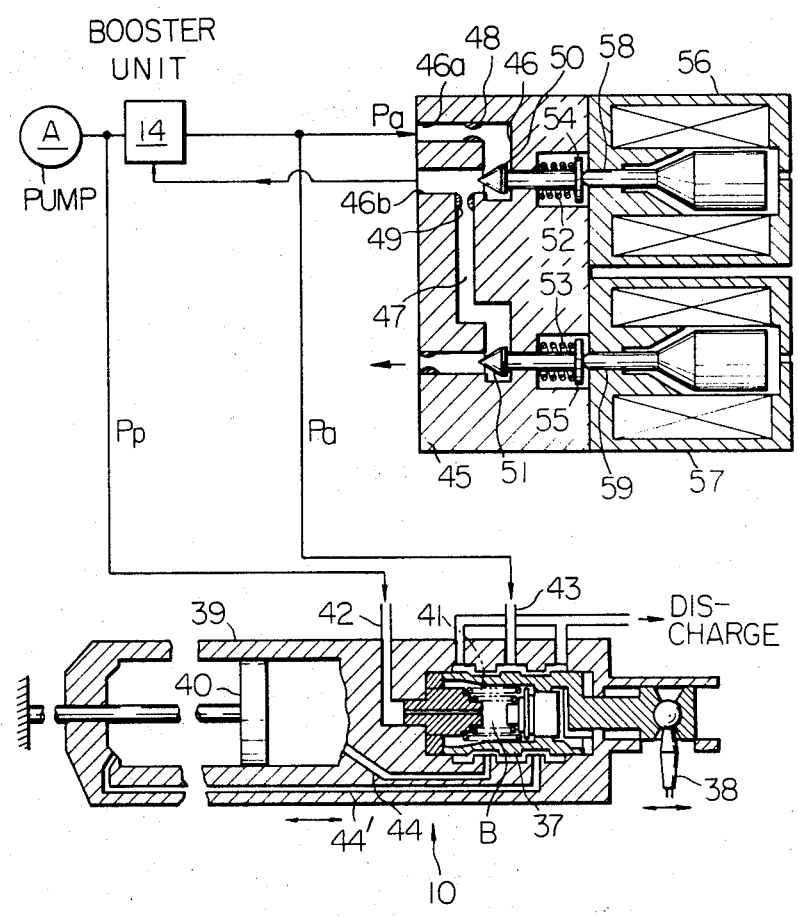
FIG. 6 is a sectional view, partly in a block form and not showing a speed detector, of a second preferred embodiment of the device according to the present invention.

Another preferred embodiment of the hydraulic-power control device in accordance with the present invention is illustrated in FIG. 6. The hydraulic circuit arrangement of the device shown herein is essentially similar to that of the device illustrated in FIG. 3 and, thus, discussion which has been given on the arrangement of FIG. 2 will be applicable thereto as it is. FIG. 6, however, shows a representative example of the constructions of the steering-control valve unit 10 and reaction chamber B for reference purposes. As seen in the lower portion of FIG. 6, the steering-control valve unit 10 includes a spool valve 37 interposed between a steering gear drop arm or an idler arm 38 and a double-acting power cylinder 39 having a piston 40. The valve unit 10 is thus shown as integral with the power cylinder 39, the shown servo mechanism therefore being of the integral type which was mentioned at the outset of this description. The spool valve 37 is centralized by springs 41 which are accommodated within the reaction chamber B formed in the valve body. The pump delivery pressure $P_p$ is directed to this reaction chamber through a port 42 while the steering-assistance fluid pressure $P_a$ is directed to annular grooves in the spool valve 37 through a port 43. This pressure $P_a$ is then directed to pressure acting chambers, not numbered, in the power cylinder 39 through passages 44 and 44', as illustrated. The operation of the servo mechanism having the above noted construction is well known in the art and, in addition, such construction is merely shown merely by way of example, no detailed description will be herein incorporated in connection with the shown mechanism.

Now, the hydraulic-power control device shown in FIG. 6 has incorporated therein an improvement which is directed to the pressure control valve unit 13. The pressure control valve unit 13 thus includes a valve housing 45 in which passages 46 and 47 are formed. One passage 46 leads to the output and input sides of the booster unit 14 through its inlet and outlet ports 46a and 46b, respectively. Between these inlet and outlet ports 46a and 46b is interposed a flow restriction or orifice 48 so as to cause a drop in the pressure of the fluid passing therethrough. Where the pressure control valve unit 13 of the shown construction is used in combination with the booster unit which is specifically constructed as illustrated in FIG. 3, these output and input sides will correspond to the ports 19 and 20, respectively. The steering assistance pressure $P_a$ is thus directed to the passage 46 anterior to the orifice 48 and the signal fluid pressure $P_s$ is delivered from the passage posterior to the orifice 48 during operation, as will be discussed later. The other passage 47 communicates at one end to the passage 46 downstream of the orifice 46 through a flow restriction or orifice 49 and opened at the other end to the outside or otherwise led to the reservoir, not shown, to return the fluid to the pump A. A pair of spring-loaded poppet valves 50 and 51 are mounted in the valve housing 45 in a manner to control the flows of fluid in the passages 46 and 47, respectively. One poppet valve 50 projects into the passage 48 posterior to the orifice 48 while the other poppet valve 51 projects into the passage 47 posterior to the orifice 49. These poppet valves 50 and 51 are respectively biased by preloaded springs 52 and 53 to fully open the passages 46 and 47. These springs 52 and 53 are shown as seated on spring seats 54 and 55, respectively, which are attached to ends of the valves. A pair of plungered solenoid devices 56 and 57 are mounted on the valve housing 45 in association with the poppet valves 50 and 51. These solenoid devices 56 and 57 include plungers 58 and 59, respectively, which are integral with or securely connected to armatures of the solenoid devices. These plungers 58 and 59 are respectively bear against the poppet valve 50 and 51 through the spring seats 54 and 55 and, when the solenoid devices 56 and 57 are de-energized, impart no driving actions to the associated poppet valves, as illustrated.

The solenoid devices 56 and 57 are connected to the speed-sensitive control which is adapted to detect the driving speed of the motor vehicle and to produce an electric signal representing the detected vehicle speed. Such control means may include the vehicle speed detector 11 and electric control circuit 12 shown in FIG. 2.

When both of the solenoid devices 56 and 57 remain concurrently de-energized, then the poppet valves 50 and 51 are held in retracted positions to fully open the passages 46 and 47 by the actions of the preloaded springs 52 and 53, respectively. As a consequence, the steering-assistance fluid pressure $P_a$ entering the passage 46 is regulated to the signal fluid pressure $P_s$ as it is reduced at the orifice 48 and partly discharged out of the passage 47 at a rate limited by the orifice 49 therein. The signal fluid pressure $P_s$ to be returned to the booster unit 14 is therefore given, if $d_1$ and $d_2$ denote respective diameters of the orifices 48 and 49, by $$P_s \approx 1/(1 + d_1^4/d_2^4) \cdot P_a$$

If, then, the solenoid device 56 is energized with the other solenoid device 57 kept de-energized, the plunger 58 protrudes so as to move the poppet valve 50 against the action of the spring 52 to an operative position to close the passage 46 anterior to its outlet port 46b and to the passage 47. The fluid pressure entering the passage 46 is completely cut off so that no fluid pressure obtains at the outlet port 46b of the passage 46. The signal fluid pressure $P_s$ is accordingly given by $$P_s \approx 0.$$

If, conversely, the solenoid device 57 is energized with the solenoid device 56 de-energized, then the plunger 59 protrudes so as to move the poppet valve 51 against the action of the spring 53 to an operative position to close the passage 47. Since, in this condition, the passage 46 is fully open, the steering-assistance fluid pressure $P_a$ is discharged from the outlet port without reduction so that the following relation now holds:

$$P_s \approx P_a.$$
3

The operative and inoperative conditions of the solenoid devices 56 and 57 are scheduled by properly programming the speed-sensitive control means in a manner to approximately follow the vehicle driving speeds, as previously mentioned. Table I shows an example of such schedules, in which the indication "ON" refers to an energized condition of the solenoid device and the indication "OFF" to a de-energized condition of the divece, and in which the characters $V_1$ and $V_2$ are different driving speeds of the motor vehicle where $0 < V_1 < V_2$.

TABLE I

| Vehicle speed | Solenoid (56) | Solenoid (57) |
|---|---|---|
| Up to $V_1$ | ON | OFF |
| $V_1$ to $V_2$ | OFF | OFF |
| Over $V_2$ | OFF | ON |

Figure 7:
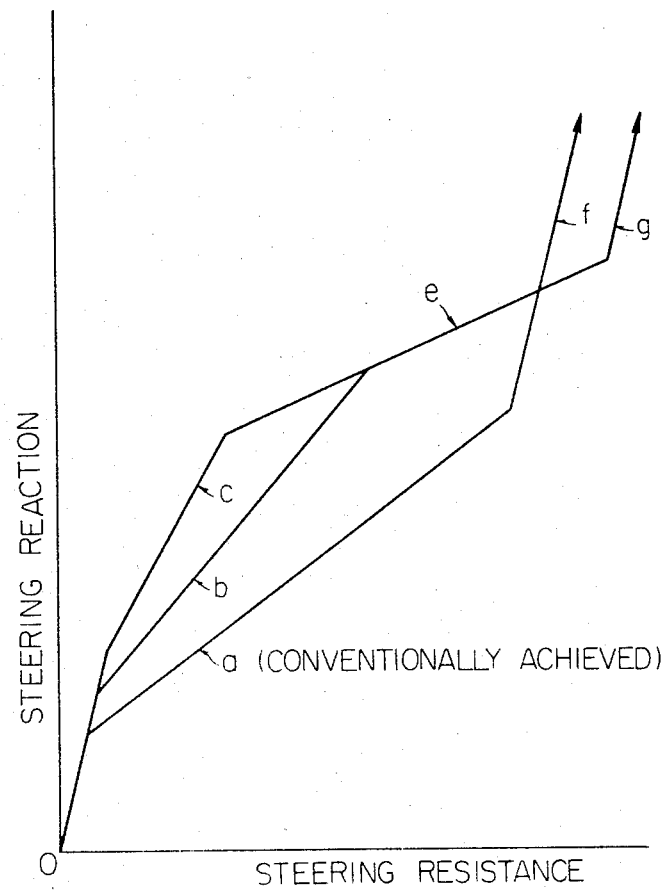
FIG. 7 is a graph indicating an example of the variation in the steering reaction in terms of the steering resistance and different driving speeds of the motor vehicle as attainable by the use of the device shown in FIGS. 6 and 8.

The operation of the hydraulic-power control device having the pressure control valve unit 13 shown in FIG. 6 will now be described with reference to the above Table I and FIG. 7. FIG. 7 shows an example of the relationship between the steering resistance (on the axis of abscissa) and the steering reaction (on the axis of ordinate) as attainable by the use of the device shown in FIG. 6.

When the motor vehicle is being driven at a speed lower than $V_1$, the solenoid device 56 is energized and the solenoid device 57 is de-energized so that the signal fluid pressure $P_s$ is dictated by Eq. 2. Thus, in the absence of the signal fluid pressure, the booster unit 14 is kept inoperative and hence $P_p \approx P_a$. The steering reaction characteristics achieved in this condition is similar to those available by the conventional power-assisted steering system, as indicated by plot $a$ in FIG. 7.

As the vehicle speed increases beyond the level $V_1$ but is lower than the level $V_2$, then the solenoids 56 and 57 are concurrently de-energized so that Eq. 1 now applies. By the aid of the signal fluid pressure $P_s$ as indicated by Eq. 1, the booster unit 14 develops the pump delivery pressure $P_p$ which is expressed as $P_p = K \cdot P_s$ where $K$ represents the pressure multiplification factor achieved by the booster unit. From this and in consideration of the relation given by Eq. 1, the pump delivery pressure $P_p$ may be written in the form $P_p = K/(1 + d_1^4/d_2^4) \cdot P_a$ It therefore follows that the ratio of the fluid pressure to be directed to the reaction chamber B vs. the steering-assistance fluid pressure given as follows:

$$P_p/P_a = K/(1 + d_1^4/d_2^4).$$

This brings out that the steering effort is multiplied by $K/(1 + d_1^4/d_2^4)$ as compared with the condition in which the motor vehicle is driven at a speed lower than the level $V_1$. The steering reaction characteristics thus achieved is indicated by plot $b$ in FIG. 7.

If the vehicle driving speed is further increased beyond the level $V_2$, then the solenoid 57 alone is energized so that, from Eq. 3 the signal fluid pressure developed by the pressure control valve unit of FIG. 6 is given by $$P_s = P_a.$$

From this it follows that the fluid pressure $P_p$ to be directed to the reaction chamber becomes $$P_p = K \cdot P_s = K \cdot P_a,$$

so that $P_p/P_a = K$. This will mean that the steering effort required in this condition is multiplied by $K$ as compared with the conventonal power-assisted steering system. The steering reaction characteristics is thus analogous to that exhibited during manual steering, as ascertained by plot $c$ of FIG. 7.

It has been assumed that the vehicle speed is increased through $V_1$ and $V_2$ in the foregoing description but essentially the same results will be achieved if the vehicle speed decreases through $V_2$ and $V_1$ with the solenoid devices 56 and 57 energized and de-energized as scheduled in Table I.

If, furthermore, the geometry of the poppet valves 50 and 51, performance characteristics of the springs 52 and 53 and/or thrusts by the plungers of the solenoid devices 56 and 57 are suitably selected, the pressure control valve unit 13 having the construction shown in FIG. 6 may be modified in a manner that the poppet valves 50 and 51 hold the previously set positions whether the solenoid devices 56 and 57 are energized or de-energized if the pressure differences across the poppet valves are greater than predetermined levels. In this instance, the poppet valves may be moved to change the signal fluid pressure $P_s$ when, for example, the steering system resumes the straight-ahead condition with the consequent reduction in the steering-assistance pressure $P_a$. The poppet valves 50 and 51 in such arrangement are thus best bestowed with self-maintaining characteristics which will contribute to preventing unexpected or abrupt variation in the steering reaction during steering operation so that the steering reaction can be varied only during straight-ahead operation. As an alternative to such self-maintaining characteristics provided on the poppet valves, the poppet valves may be controlled to achieve the same results through suitable electrical arrangement which may contain means to detect the steering angle in the steering system.

Turning back to FIG. 7, the plot $e$ indicates the steering reaction characteristics resulting from the operation of the booster unit 14, viz., from the motion of a pressure relief valve which is mounted in the booster unit in order to relieve the pump delivery pressure when the pressure increases beyond a predetermined level. This pressure relief valve may be constructed, by way of example, as the valve 31 in the booster unit 14 shown in FIG. 3. The plot $f$, on the other hand, the steering reaction characteristics which is achieved by the use of a pressure relief valve which may be mounted in the booster unit so as to relieve the steering-assistance pressure $P_a$ in the event the pressure increases to a predetermined level. This pressure relief valve may be constructed as the valve 32 in the embodiment shown in FIG. 3.

The hydraulic-power control device shown in FIG. 6 has advantages which are summarized as follows:

a. Lower production cost and higher reliability than the prior art hydraulic-power control devices using servo valves.
b. Safety driving of the motor vehicle and assured feeling in steering because of the steering reaction changed only during straight-ahead condition.
c. Pump capacity saved because the signal fluid pressure is cut off during low-speed driving.
d. Limited power consumption by the solenoid devices because they are de-energized under the intermediate-speed driving condition which is set up most frequently by the motor vehicle.
e. Fail-safe characteristics by which the pressure control vaves assume the conditions of the intermediate-speed driving in the event the unit or associated parts and elements fail.

Figure 8:
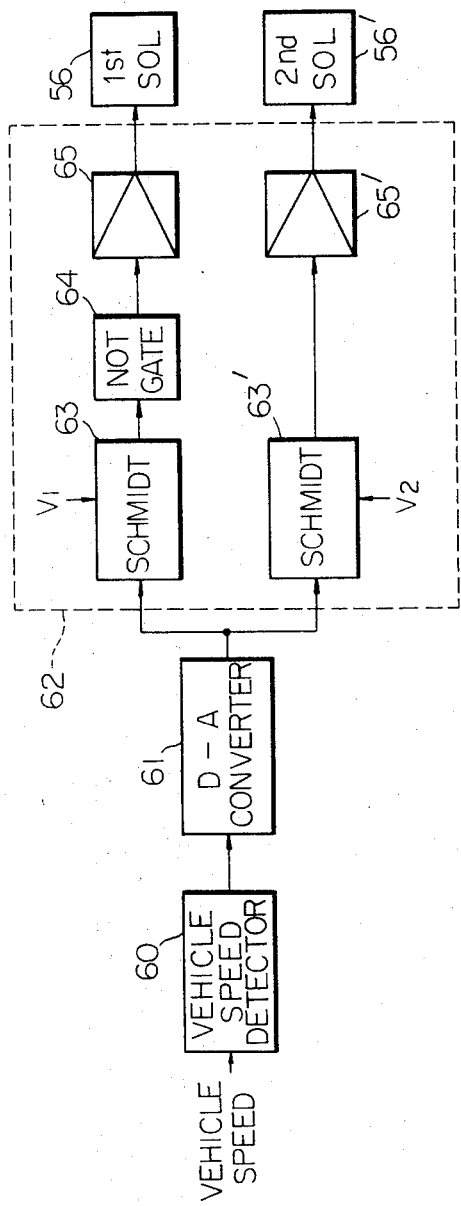
FIG. 8 is a block diagram illustrating a preferred electric arrangement of the speed-sensitive control means forming part of the device which is illustrated in FIG. 6.

FIG. 8 now illustrates a preferred form of speed-sensitive control means which is adapted to selectively energize and de-energize the solenoid devices of the pressure control valve unit of the embodiment shown in FIG. 6 in accordance with the driving speed of the motor vehicle.

Referring to FIG. 8, the speed-sensitive control means includes a vehicle-speed detector 60 which detects the revolution speed of the vehicle wheel or wheels or of the propeller shaft of the vehicle driveline and produces a signal voltage which is proportional to the detected vehicle speed. This signal voltage is converted into an A.C. voltage by a D.C.-to-A.C. converter 61 and the thus obtained A.C. voltage is supplied to a switch circuit 62. The switch circuit 62 is made up of a pair of Schmidt trigger circuit 63 and 63' having trigger levels corresponding to the vehicle speeds $V_1$ and $V_2$, respectively. One Schmidt trigger circuit 63 is connected to a NOT-gate circuit 64 which, in turn, is connected to the solenoid cell of the solenoid device 56 through an amplifier 65. The other Schmidt trigger circuit 63' is connected to the solenoid device 57 through an amplifier 65'.

When, thus, the vehicle-speed detector 60 detects a vehicle driving speed which is lower than the level of $V_1$, then both of the Schmidt trigger circuits 63 and 63' are inoperative. The NOT-gate circuit therefore produces an output to energize the solenoid device 56 while, in the absence of an output from the Schmidt trigger circuit 63', the other solenoid device 57 is de-energized. This is in agreement with the schedules of Table I.

If the detector 60 detects a vehicle speed which is intermediate between $V_1$ and $V_2$, then the Schmidt trigger circuit 63 becomes operative so that the NOT-gate does not produce the output while the Schmidt trigger circuit 63' is kept inoperative. This established the condition in which the two solenoid devices 56 and 57 are de-energized, as indicated in Table I.

When the detector 60 detects a vehicle speed which is higher than the level of $V_2$, then both of the Schmidt trigger circuits 63 and 63' become operative so that the solenoid device 56 is de-energized and the solenoid device 57 energized, as scheduled in Table I.

In order to provide the previously mentioned self-maintaining characteristics of the pressure control valve unit, the circuit arrangement shown in FIG. 8 may be further provided with a hysteresis element or circuit, if desired.

Figure 9:
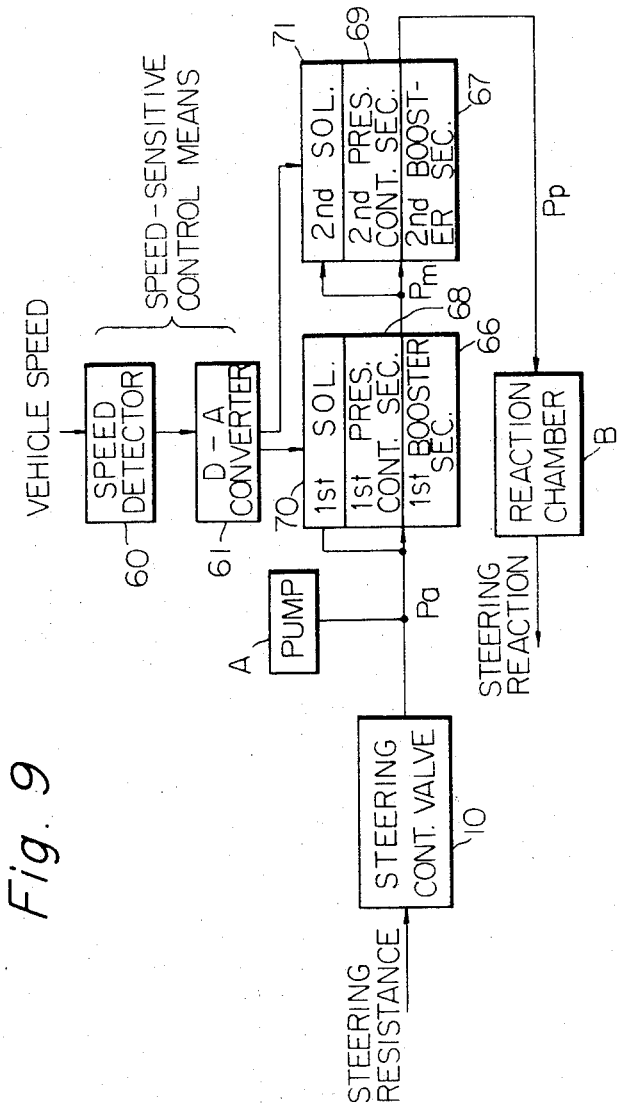
FIG. 9 is a block diagram showing a third preferred embodiment of the device according to the present invention.

A third preferred embodiment of the hydraulic power control device in accordance with the present invention will now be described with reference to FIGS. 9 and 10. The embodiment herein shown is characterized in that the pressure control valve unit is hydromechanically connected to the booster unit, different from the previously described embodiments in which they are only hydraulically associated with each other. Further different from the prior embodiments, the third embodiment is adapted to control the booster in accordance with four different vehicle speed ranges. For this purpose, the booster unit comprises two mutually associated parts which are herein referred to as first and second booster sections 66 and 67, respectively, as shown in block form in FIG. 9. These first and second booster sections 66 and 67 are connected in series with the steering control valve unit 10 and reaction chamber B. The booster sections 66 and 67 are associated respectively with first and second pressure control valve sections 68 and 69, respectively, which, as combined, constitute the pressure control valve unit of the hydraulic-power control device according to the present invention. These first and second pressure control valve sections include first and second solenoid devices 70 and 71, respectively, which are connected to suitable speed-sensitive control means adapted to produce an electric signal in accordance with the motor vehicle driving speed. The detailed constructions of the booster sections 66 and 67 and pressure control valve sections 68 and 69 are illustrated in FIG. 10.

Figure 10:
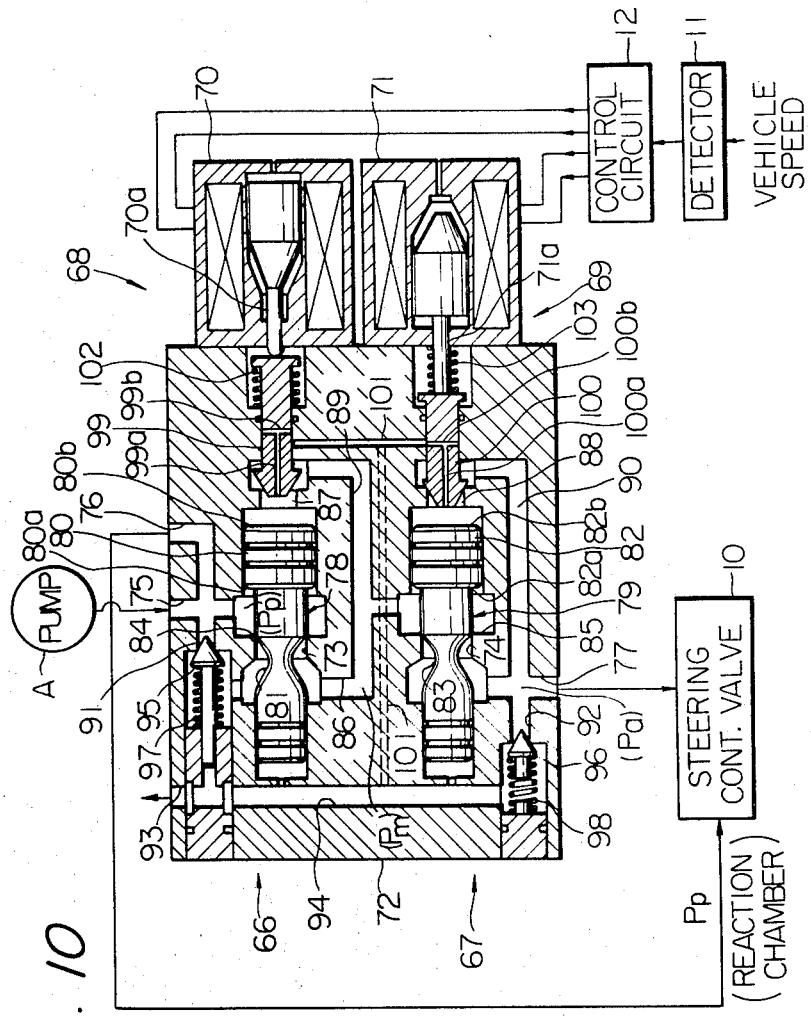
FIG. 10 is a sectional view showing, in detail, a preferred construction of the booster and pressure control valve units forming part of the device illustrated in FIG. 9.

Referring to FIG. 10, the booster unit as shown comprises a housing structure 72 having parallel, generally cylindrical, first and second bores 73 and 74, respectively. The first bore 73 communicates on its input side with the pump A through an inlet port 75 and with the reaction chamber B through an outlet port 76 which leads from the inlet port 75. The second bore 74 communicates on its output side with the steering-control valve unit 10 through a port 77. First and second directional balanced valves 78 and 79 are axially slidably received in the bores 73 and 74, respectively. The first balanced valve 78 has a land 80 and a constriction 81 and, likewise, the second balanced valve 79 has a land 82 and a constriction 83, as illustrated. The lands 80 and 82 respectively have inner smaller working faces 80a and 82a and outer large working faces 80b and 82b. The constrictions 81 and 83 provide adjustable flow restrictions or orifices 84 and 85, respectively, which are defined by circumferential edges of associated stepped portions of the bores 73 and 74 and cooperating circumferential edges at which the constrictions terminate. An intermediate passage 86 provides fluid communication between the bores 73 and 74 around these constrictions 81 and 83, respectively, so that an output side of the first booster section 66 is hydraulically connected to an input side of the second booster section 67.

First and second fluid pressure acting chambers 87 and 88 are formed in contact with the outer faces 80b and 82b of the lands 80 and 82, respectively. The first pressure acting chamber 87 communicates with the intermediate passage 86 through a passage 89 while the second pressure acting chamber 88 communicates with the port 77 through a passage 90. The balanced valves 78 and 79 are thus subjected to forces resulting from the fluid pressures acting on the smaller and larger working faces of the lands 80 and 82, respectively. When, therefore, pressure differences take place across these lands 80 and 82, the valves 78 and 79 are moved in either direction until equilibrium is achieved by the valves.

For the purpose that the input fluid pressure (or the pump delivery pressure $P_p$) to the first booster section 66 and the output fluid pressure (or the steering-assistance pressure $P_a$) be prevented from rising to excessively high levels, valved, first and second bypass passages 91 and 92 respectively are provided. The first bypass passage 91 leads from the inlet port 75 from the pump A to the bore 73 substantially surrounding the constriction 81 and is opened or let to the reservoir, not shown, through a drain port 93. The second bypass passage 92, on the other hand, communicates with the bore 74 substantially surrounding the constriction 83 and accordingly with the port 77 and is opened or led to the not shown reservoir through, for example, a drain passage 94 leading to the port 93. First and second spring-loaded pressure relief valves 95 and 96 are interposed between ends of the bypass passages 91 and 92, respectively. These relief valves 95 and 96 are formed as poppet valves, each subjected on its input and output sides different forces resulting from the fluid pressures obtaining at both ends of the associated bypass passage. The valves 95 and 96 are biased to close the respective bypass passages by means of preloaded springs 97 and 98, respectively. The preload of each of these springs is suitably selected so that, when a pressure difference across the associated valve exceeds a predetermined level, the valve is moved against the action of the spring to open the associated bypass passage for draining off an excess of the pressure obtaining on the input side of the valve.

The pressure control valve section 68 is mounted on the housing structure 72 of the booster unit thus constructed and has first and second pressure control poppet valves 99 and 100 which are associated with the first and second booster sections 66 and 67, respectively. These poppet valves 99 and 100 extend toward the fluid pressure acting chambers 87 and 88 of the first and second booster sections 66 and 67, respectively, and are axially movable into or away from these chambers so as to interrupt or establish fluid communication between the pressure acting chambers 87 and 88 and the passages 89 and 90, respectively. The poppet valves 99 and 100 have formed therein axial passages 99a and 100a which are opened each at one end to the pressure acting chambers 87 and 88 and have at the other radial passages 99b and 100b. A drain passage 101 leading from the drain passage 94 is opened at its branched ends adjacent the poppet valves 99 and 100. The radial passages 99b and 100b are so located as they are brought into alignment with the branched ends of the drain passage 101 when the poppet valves 99 and 100 are in operative, protruded positions, respectively. The first poppet valve 99 is biased by a preloaded spring 102 in a direction to establish fluid communication between the pressure acting chamber 87 and passage 89 and to interrupt the communication between the radial passage 99b and the drain passage 101. The second poppet valve 100, on the other hand, is biased by a preloaded spring 103 in a direction to close the pressure acting chamber 88 and to establish fluid communication between the radial passage 100b and passage 101.

These poppet valves 99 and 100 are associated with the first and second solenoid devices 70 and 71, respectively, which are previously mentioned. The solenoid devices 70 and 71 have plungers 70a and 71a which are shown as integral with armatures, not numbered, of the solenoid devices. The plunger 70a of the first solenoid device 70 bears against the poppet valve 99 in a manner to move the valve forward viz., closing the pressure acting chamber 87 when the solenoid device is energized while the plunger 71a is rigidly connected to the poppet valve 100 in a manner to move the valve backward, viz., away from the pressure acting chamber 88 when the solenoid device is energized.

The solenoid devices 70 and 71 have exciting coils connected through electric lines, not numbered, to the speed-sensitive control means which is adapted to supply an electric signal representing the vehicle driving speed. This control circuit 12 is generally programmed in a manner to energize and de-energize the solenoid devices 70 and 71 in accordance with the schedules indicated in Table II, in which the corresponding conditions of the poppet valves 99 and 100 are also indicated by "OPEN" referring to the open conditions of the pressure acting chambers 87 and 88 and "CLOSED" referring to the closed conditions of the chambers. The indications $V_1$, $V_2$ and $V_3$ refer to different driving speeds of the motor vehicle which are used as references in the electric control circuit, where $0 < V_1 < V_2 < V_3$.

TABLE II

| Vehicle speed | 1st solenoid (70) | 2nd solenoid (71) | 1st valve (99) | 2nd valve (100) |
|---|---|---|---|---|
| Up to $V_1$ | on | off | closed | closed |
| $V_1$ to $V_2$ | off | off | open | closed |
| $V_2$ to $V_3$ | on | on | closed | open |
| Above $V_3$ | off | on | open | open |

Figure 11:
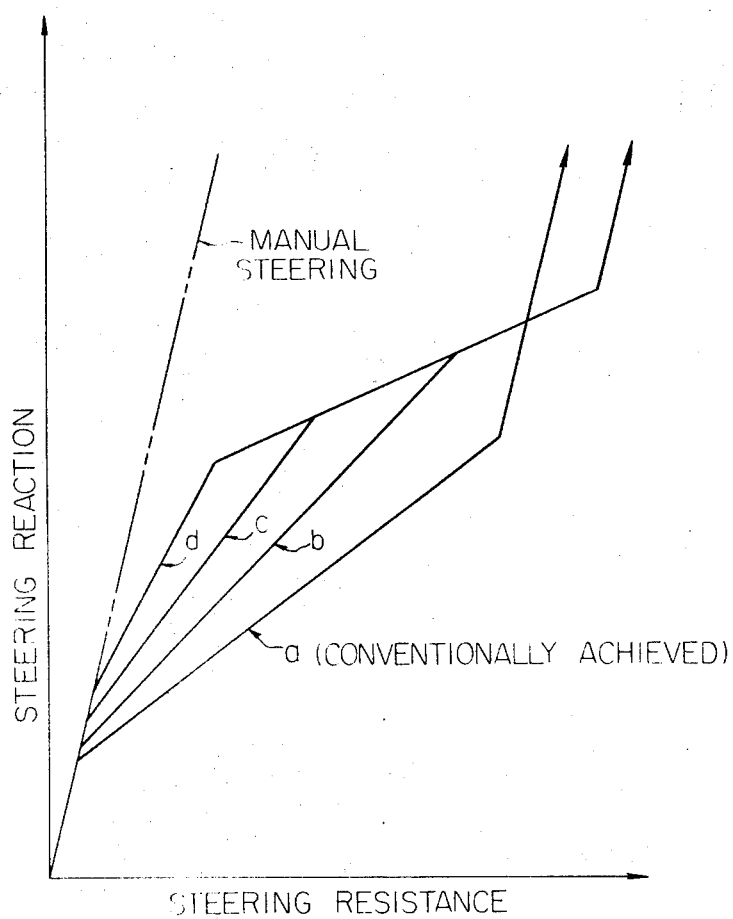
FIG. 11 is a graph indicating an example of the variation in the steering reaction in terms of the steering resistance and different driving speeds of the motor vehicle as attainable by the use of the device shown in FIGS. 9, and 10.

With reference to the above Table II and to FIG. 11, the operation of the booster unit shown in FIG. 10 under the conditions corresponding to the vehicle speed ranges through $V_1$, $V_2$ and $V_3$.

When the motor vehicle is driving at a speed lower than $V_1$, the first solenoid device 70 is energized and the second solenoid device 71 de-energized so that the plunger 70a moves the poppet valve 99 to close the pressure acting chamber 87 against the action of the spring 102 and the poppet valve 100 is forced to close the pressure acting chamber 88 by the action of the spring 103, in accordance with the schedules of Table II. Under this condition in which the poppet valves 99 and 100 are in protruded positions, the radial passages 99b and 100b in the poppet valves 99 and 100, respectively are brought into alignment with branched ends of the drain passage 101 so that the fluid entrapped in each of the pressure acting chambers 87 and 88 is drained off via the drain passage 94 and drain port 93. This establishes conditions in which the balanced valves 78 and 79 are subjected to fluid pressures acting only upon the smaller working faces 80a and 82a in the absence of the fluid pressure in the pressure acting chambers 87 and 88, respectively. It therefore, follows that the balanced valve 78 is moved rightwardly of the drawing, viz., toward the pressure acting chamber 87 by a force resulting from the pump delivery pressure $P_p$ applied to the smaller working face 80a of the land 80. The adjustable orifice 84 is consequently fully opened so that no pressure drop is invited in the fluid pressure passing therethrough. The fluid pressure in the intermediate passage, referred as $P_m$, is equalized with the pump delivery pressure $P_p$, hence $P_p \approx P_m$. This fluid pressure acts upon the smaller working face 82a of the land 82 of the balanced valve 79 so that, in the absence of the fluid pressure in the pressure acting chamber 88, the valve 79 is also moved rightwardly, viz., toward the chamber 88, thereby fully opening the adjustable orifice 85. The fluid pressure $P_p$ or $P_m$ is consequently passed from the passage 86 over to the port 77 without being subjected to restriction. The steering-assistance fluid pressure $P_a$ is thus equal to the fluid pressure $P_m$, hence $P_a \approx P_m$. The multiplification factor achieved in this condition by the booster unit is therefore 1. The result is that the steering reaction is of the same level as available in the prior art power-assisted steering system under similar conditions, as indicated by plot a in FIG. 11. The driver of the motor vehicle will therefore be able to softly steer the motor vehicle under this low-speed driving condition.

When the electric signal supplied from the control circuit 12 represents a vehicle driving speed intermediate between $V_1$ and $V_2$, both of the solenoid devices 70 and 71 are de-energized so that the first poppet valve 99 is moved by the action of the spring 102 to a position to open the pressure acting chamber 87 while the second poppet valve 100 is inveriably held in the position to close the pressure acting chamber 88, as illustrated in FIG. 10. Under this condition, the fluid communication between the pressure acting chamber 87 and drain passage 101 is interrupted by the poppet valve 99, the fluid pressure $P_m$ is directed to the chamber 87 through the passage 89 so as to act upon the larger working face 80b of the land 80 of the balanced valve 78. The balanced valve 78 is consequently moved leftwardly of the drawing, viz., away from the pressure acting chamber 87 overcoming the force resulting from the pump delivery pressure $P_p$ acting upon the smaller working face 80a of the land 80. This causes the adjustable orifice 84 to be closed by the balanced valve 78 with a consequent rise in the pump delivery pressure $P_p$. This increased pump delivery pressure $P_p$ acts upon the smaller working face 80a of the land 80 to urge the valve 78 against the opposing force exerted on the larger working 80b whereby the valve 78 is returned toward the pressure acting chamber 87 until the opposed forces on both sides of the land 80 are equalized to each other. If, therefore, the areas of the working faces 80a and 80b of the land 80 are denoted by $A_p$ and $A_{m1}$, respectively, then the ratio of $A_p$ to $A_{m1}$ is $A_p/A_{m1}$ and hence $P_p = (A_{m1}/A_p) \cdot P_m$ so that the pump delivery pressure is multiplied. Since, on the other hand, the poppet valve 100 is held in the position to close the pressure acting chamber 88 to drain off the fluid in the chamber 88 to the passage 101 so as to establish the relation $P_a \approx P_m$ as previously discussed, the pump delivery pressure $P_p$ is expressed as $P_p \approx (A_{m1}/A_p) \cdot P_a$ so that the pressure multiplification factor is $K_1 = A_{m1}/A_p$. This indicates that the steering reaction in the reaction chamber of the servo mechanism is $K_1$ times greater than that available in the prior art power-assisted steering system, as will be ascertained from plot b in FIG. 11.

When the vehicle driving speed lies between $V_2$ and $V_3$, then both of the solenoid devices 70 and 71 are energized so that the plunger 70a moves the poppet valve 99 to the position to close the pressure acting chamber 87 against the action of the spring 102 while the plunger 71a pulls the poppet valve 100 to retract from pressure acting chamber 88 against the action of the spring 103. In this condition, the fluid in the pressure acting chamber 87 is drained off through the drain passage 101 which is now aligned with the radial passage 99b in the first poppet valve 99. The balanced valve 78 is therefore moved to its rightmost position in the drawing so that the pump delivery pressure $P_p$ is passed to the input side of the second booster section 67 without being reduced with the adjustable orifice 84 fully open, thus $P_p \approx P_m$. Concurrently in the second booster section 67, the fluid communication between the pressure acting chamber 88 and the drain passage 101 is interrupted by the poppet valve 100 in the retracted position and, instead, the pressure acting chamber 88 is now permitted to communicate through the passage 90 with the port 77. Thus, the steering-assistance fluid pressure $P_a$ obtaining in this port 77 is directed to the pressure acting chamber 88 and acts upon the larger working face 82b of the land 82 of the second balanced valve 79. The force resulting from this pressure $P_1$ therefore overcomes the force resulting from the fluid pressure $P_m$ acting upon the opposite smaller working face 82a, thereby moving the balanced valve 79 leftwardly of the drawing, viz., away from the pressure acting chamber 88 so as to fully close the adjustable orifice 85. This causes the fluid pressure $P_m$ in the intermediate passage 86 to rise and the increased pressure is now applied to the smaller working face 82a of the land 82. The balanced valve 79 is consequently moved in a reverse direction toward the pressure acting chamber 88 until equilibrium is achieved on both sides of the land 82, viz., between the input and output sides of the second booster section 67. Thus, if the smaller and larger faces 82a and 82b of the land 82 are assumed to have areas of $A_{m2}$ and $A_a$, then the ratio between such areas is $A_{m2}/A_a$ and accordingly the fluid pressure $P_m$ is given by $P_m = (A_a/A_{m2}) \cdot P_a$, achieving multiplification in the fluid pressure. In consideration of the relation $P_p \approx P_m$ as previously noted, the pump delivery pressure is $P_p \approx (A_a/A_{m2}) \cdot P_a$ so that the pressure multiplification factor $K_2$ is given by $K_2 = A_a/A_{m2}$. From this it is noticed that the pressure to be directed to the reaction chamber is multiplied by $K_2$ as compared with the prior art power-assisted steering system and accordingly that the steering reaction is increased in proportion to this increment, as will be observed from plot c in FIG. 11.

When the electric control circuit responds to a vehicle driving speed which is higher than $V_3$, then the first solenoid device 70 is de-energized and the second solenoid device 71 is energized. As a consequence, the first poppet valve 99 is forced to retract from the pressure acting chamber 87 by the action of the spring 102 and concurrently the second poppet valve 100 is moved by the plunger 71a against the action of the spring 103 to retract from the pressure acting chamber 88. The radial passages 99b and 100b in the poppet valves 99 and 100, respectively, are isolated from the drain passage 101 with the result that $P_p = K_1 \cdot P_m$ and $P_m = K_2 \cdot P_a$ as will be understood from the above discussion. The pump delivery pressure is therefore given by $P_p = K_1 \cdot K_2 \cdot P_a$ from the above equations. This indicates that the pressure to be directed to the reaction chamber is multiplied by a multiplification factor $K_3$ which is expressed as $K_3 = K_1 \cdot K_2 = (A_{m1}/A_p) \times (A_a/A_{m2})$. The steering reaction is accordingly multiplied as indicated by plot $d$ in FIG. 11.

Figure 12:
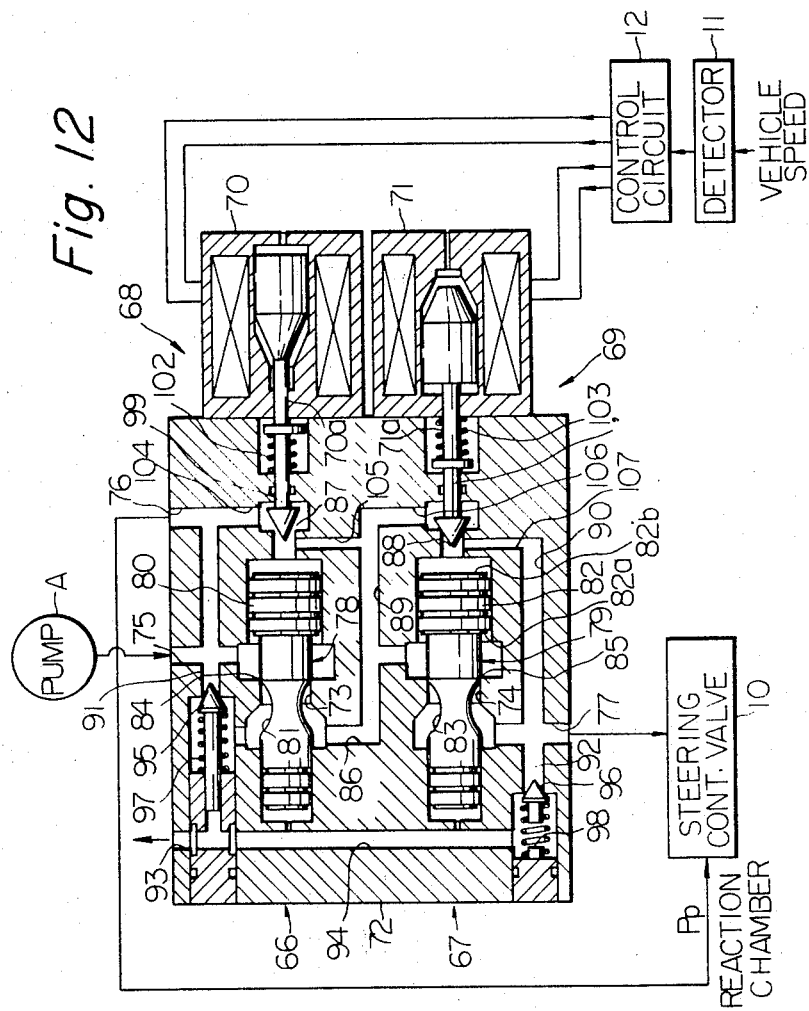
FIG. 12 is a view similar to FIG. 10 but now shows a modification of the device shown therein.

A still another preferred embodiment of the hydraulic-power control device in accordance with the present invention is now illustrated in FIG. 12. The embodiment herein shown is a modification to the device shown in FIG. 10 and, as such, includes a booster unit which is essentially similarly constructed to the booster unit of the device shown in FIG. 10. Like reference numerals and characters therefore indicate corresponding parts and fluid lines in the two embodiments. Different from the booster unit of FIG. 10, interruptible fluid communication is provided between the input and output sides of the modified booster unit, in addition to the fluid line starting at the port 75 from the pump A and terminating at the port 77 to the steering-control valve unit 10. Such additional fluid line includes a passage 104 communicating at one end with the ports 75 and 76 and at the other end with the pressure acting chamber 87 of the first booster section 66 through the first poppet valve 99. The pressure acting chamber 87, in turn, is in constant fluid communication through a passage 105 with the passage 89 leading from the intermediate passage 86. This passage 89, still in turn, communicates with the pressure acting chamber 88 of the second booster section 67 through a passage 106 and the second poppet valve 100. The pressure acting chamber 88 is in constant fluid communication through a passage 107 with the passage 90 leading from the port 77 to the steering-control valve unit 10. The pressure control valve unit of the shown embodiment is also similarly constructed to its counterpart in FIG. 10. The poppet valves 99 and 100, however, built as solid members and, thus, have no passages or fluid lines fomred therein. The drain passage 101 as formed in the housing structure of the booster unit shown in FIG. 10 is therefore removed from the booster unit of the modified construction. The booster unit and pressure control valve unit are otherwise entirely similarly constructed to those of FIG. 10 and, as such, the detailed discussion hereinbefore given to the corresponding parts and fluid lines will apply thereto. The solenoid devices 70 and 71 are, however, controlled in accordance with schedules which are different from those previously tabulated. The schedules governing the solenoid devices applicable to the embodiment of FIG. 12 are indicated in Table III.

TABLE III

| Vehicle speed | 1st solenoid (70) | 2nd solenoid (71) | 1st valve (99) | 2nd valve (100) |
| --- | --- | --- | --- | --- |
| Up to $V_1$ | off | on | open | open |
| $V_1$ to $V_2$ | off | off | open | closed |
| $V_2$ to $V_3$ | on | on | closed | open |
| Above $V_3$ | on | off | closed | closed |

Now, in operation, the first solenoid device 70 is de-energized and the second solenoid device 71 energized when the vehicle driving speed as detected is lower than $V_1$ in accordance with the schedules indicated in Table III. The first poppet valve 99 is withdrawn from the pressure acting chamber 87 by the action of the spring 102 and the second poppet valve 100 is withdrawn from the pressure acting chamber 88 by the pulling force from the plunger 71a of the solenoid device 71 against the action of the spring 103. This establishes continuous, unrestricted fluid communication between the passages 104 and 107 through the passages 105 and 106 and pressure acting chambers 87 and 88. In this condition, the pump delivery pressure $P_p$ is passed to the first pressure acting chamber 87 through the passage 104, thereby acting upon the larger working face 80b of the land 80 of the first balanced valve 78. The pump delivery pressure $P_p$ also acts upon the smaller working face 80a of the land 80 but, because of the difference in area between the two working faces, the balanced valve 78 is moved away from the pressure acting chamber 87. The adjustable orifice 84 is consequently closed so that the pump delivery pressure $P_p$ is entirely passed to the pressure acting chamber 87. Thus, $P_p \approx P_m$. This fluid pressure is then directed to act upon the opposite working faces 82a and 82b of the land 82 of the second balanced valve 79 through the passages 89 and 106, respectively. This causes the balanced valve 79 to move away from the pressure acting chamber 88 because of the differential areas of the working faces 82a and 82b so as to fully close the adjustable orifice 85. The fluid pressure obtaining in the first pressure acting chamber 87 is entirely directed to the port 77 through the passages 105 and 106, second pressure acting chamber 88 and passages 107 and 90 in this sequence. Thus, $P_m = P_a$ so that $P_p \approx P_a$ because $P_p = P_m$ as above noted. The pressure multiplification factor is therefore 1. This multiplification factor is equal to that available in the prior art power-assisted steering system.

When the vehicle driving speed intervenes between $V_1$ and $V_2$, both the first and second solenoid devices 70 and 71, respectively, are de-energized. The first poppet valve 99 remains withdrawn from the pressure acting chamber 87 so that the pump delivery pressure $P_p$ is directed to the passage 105 through the passage 104 and chamber 87 without interruption and restriction. Thus, $P_p \approx P_m$, as previously discussed. The second poppet valve 100, on the other hand, is forced by the action of the spring 103 to project into the pressure acting chamber 88, thereby blocking entry of the fluid pressure $P_m$ to the chamber 88 from the passage 106. This fluid pressure $P_m$ is consequently entirely directed to the passage 89 and acts upon the smaller working face 82a of the land 82 of the balanced valve 79. The balanced valve 79 is moved toward the pressure acting chamber 88 so as to fully open the adjustable orifice 85. The fluid in the passage 89 is now directed to the port 77 and passage 90. The pressure thus developed in the passage 90 acts upon the large working face 82b of the land 82 through the passage 107 and chamber 88 whereupon the balanced valve 79 is moved in a reverse direction, viz., away from the chamber 88. This movement terminates when the opposing forces resulting from the fluid pressures acting upon both working faces 82a and 82b of the land 82 are equalized. If, therefore, the working faces 82a and 82b have areas of $A_{m2}$ and $A_a$, then $P_m = (A_a/A_{m2}) \cdot P_a$, thus achieving multiplification in the fluid pressure. In consideration of the relation $P_a \approx P_m$, there results $P_a = (A_a/A_{m2}) \cdot P_a$ so that pressure multiplification factor $K_2$ is given by $K_2 = A_a/A_{m2}$. This indicates that the fluid pressure to be directed to the reaction chamber of the servo mechanism is multiplied by $K_2$ in comparison with the case with the prior art steering system.

During the condition in which the motor vehicle is driven at a speed intervening between $V_2$ and $V_3$, both the first and second solenoid are concurrently energized so that the first poppet valve 99 is moved to a position to interrupt the fluid communication between the passage 104 and pressure acting chamber 87 against the action of the spring 102 while the second poppet valve 100 is withdrawn from the pressure acting chamber 88 against the action of the spring 103 to establish uninterrupted communication between the passage 106 and chamber 88. Since, thus, entry of the fluid from the passage 104 to the pressure acting chamber 87 is blocked by the poppet valve 99, the pump delivery pressure $P_p$ solely acts upon the smaller working face 80a of the land 80 of the first balanced valve 78, which is consequently moved toward the pressure acting chamber 87 to fully open the adjustable orifice 84. The pump delivery pressure $P_p$ is directed to the intermediate passage 86 without positive limitation and acts upon the larger working face 80b of the land 80 through the passages 89 and 105. The balanced valve 78 is now moved away from the pressure acting chamber 87 until equilibrium is achieved on both sides of the land 80. If, thus, the areas of the smaller and larger working faces 80a and 80b of the land 80 are denoted by $A_p$ and $A_{m1}$, respectively, then there results $P_p = (A_{m1}/A_p) \cdot P_m$, achieving the purpose of fluid multiplication. Since, under this condition, fluid communication is built up between the passage 106 and the second pressure acting chamber 88, the second balanced valve 79 is moved away from the chamber 88 to close the adjustable orifice 85 so that the fluid pressure $P_m$ is entirely directed to the port 77 through the passage 106, chamber 88, and passages 107 and 90 in this sequence. This results in the relation $P_a \approx P_m$, from which $P_a = (A_{m1}/A_p) \cdot P_p$ for, as above noted, $P_p = (A_{m1}/A_p) \cdot P_m$. The resultant pressure multiplification factor $K_1$ is given by $K_1 = A_{m1}/A_p$. The pressure to be directed to the reaction chamber and accordingly the steering reaction are therefore multiplied by $K_1$ as compared with those available in the prior art steering system.

When the vehicle driving speed exceeds $V_3$, then the first solenoid device 70 is energized and the second solenoid device 71 de-energized as indicated in Table III. The first and second poppet valves 99 and 100 are accordingly in the positions to shut off the flows of the fluid from the passage 104 to the pressure acting chamber 87 and the fluid from the passage 106 to the pressure acting chamber 88, respectively. As a consequence, the first and second balanced valves 78 and 79 are brought to a standstill when the opposing forces exercised on both sides of each of them are equalized in a manner previously discussed. This will establish conditions where $P_p = K_1 \cdot P_m$ and $P_m = K_2 \cdot P_a$ so that $P_p = K_1 \cdot K_2 \cdot P_a$. The multiplification factor $K_3$ resulting from such conditions is therefore given by $K_3 = K_1 \cdot K_2 = (A_{m1}/A_p) \times (A_a/A_{m2})$. The steering reaction thus achieved is $K_3$ times greater than that available in the prior art power-assisted steering system.

The steering reaction characteristics which are attained by the use of the embodiment shown in FIG. 12 are essentially comparable to those shown in FIG. 11.

In putting the embodiments shown in FIGS. 10 and 12, suitable arrangement may be made, if desired, so that the poppet valves 99 and 100 are not moved irrespective of the operative and inoperative conditions of the associated solenoid devices 70 and 71 if and when the fluid pressure or pressures acting upon the first and second balanced valves 78 and 79, respectively, are greater than predetermined level or levels. The arrangement of this nature will prove useful in regulating the steering reaction only if the fluid pressure or pressures are under the predetermined level or levels and only under the straight-ahead condition of the steering system. Such arrangement may be realized through proper selection of the geometry of the poppet valves 99 and 100, preload characteristics of the springs 102 and 103 and/or strokes of the plungers 70a and 71a of the solenoid devices 70 and 71, respectively. Or otherwise, the arrangement may include an electric control circuit which is specifically adapted to detect the steering angle so as to produce an electric control signal representing the detected steering angle whereby the steering reaction can be varied during straight-ahead driving.

Arrangement may also be made for the purpose that the reference vehicle driving speeds $V_1$, $V_2$ and $V_3$ on which the solenoid devices are operable be shifted depending upon acceleration and deceleration conditions of the motor vehicle. Such purpose may, for instance, be accomplished through provision of suitable control means such as an electrically operating hysteresis element or elements which may form part of the electric control circuit 12 previously mentioned.

If preferred, furthermore, governors or similarly operating devices may be used in lieu of the solenoid devices forming part of the pressure control valve unit of the device according to the present invention. This will be useful in controlling the poppet valves in an analog fashion in contrast to the digital actions available by the solenoid devices.

In addition to the advantages previously enumerated in connection with the embodiment shown in FIG. 6, the embodiments of FIGS. 10 and 12 have advantages which are summarized as follows:

a. Steering reaction characteristics controlled more minutely depending upon the varying vehicle driving speeds.
b. Freedom from "plugging" of the working fluid which might otherwise invited where fixed constrictions or restrictions are incorporated in the fluid lines.
c. Hence, ease of maintenance and servicing of the hydraulic circuits.

Figure 13:
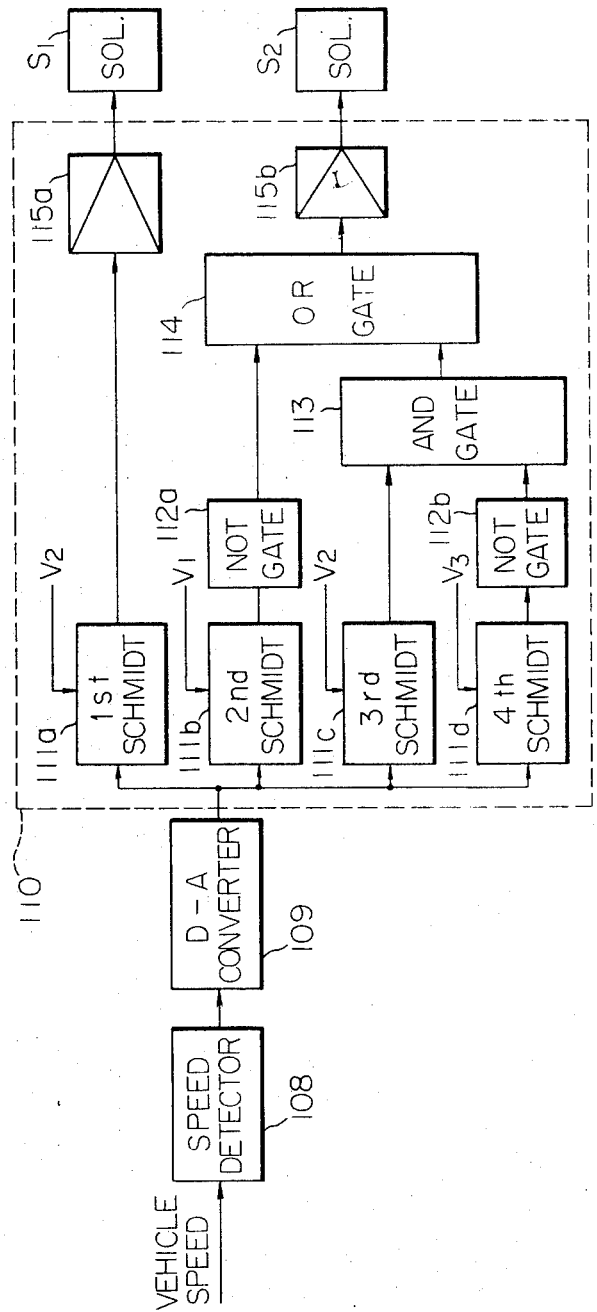
FIG. 13 is a block diagram of a preferred electrical arrangement of the speed-sensitive means of the device shown in FIG. 9.

The speed-sensitive means to control the pressure control valve unit shown in FIG. 10 or 12 may be constructed in any desired manner insofar as the intent of actuating the valve unit in accordance with the vehicle driving speed is maintained. FIG. 13 illustrates a preferred form of such speed-sensitive control means.

Referring to FIG. 13, the control means includes a vehicle-speed detector 108 which detects the revolution speeds of either the vehicle wheel or wheels or the propeller shaft of the vehicle driveline so as to produce a signal voltage which is proportional to the detected revolution speed. The signal voltage is converted into an A.C. voltage by a D.C.-to-A.C. converter 109 to which the vehicle-speed detector 108 is connected. The thus obtained A.C. voltage is supplied to a switch circuit 110 which is shown as enclosed by dashed lines. The switch circuit 110 comprises first, second, third and fourth Schmidt trigger circuits 111a, 111b, 111c and 111d, respectively. Of these, the first and third Schmidt trigger circuits 111a and 111c, respectively, have a common trigger level corresponding to the vehicle speed of $V_2$, while the second and fourth Schmidt trigger circuits 111b and 111d have trigger levels which are in agreement with the vehicle speeds of $V_1$ and $V_3$, respectively. The second and fourth Schmidt trigger circuits 111b and 111d are connected to first and second NOT-gate circuits 112a and 112b, respectively, so that output signals are produced from these NOT-gate circuits in the absence of output signals from the preceding Schmidt trigger circuits. The third Schmidt trigger circuit 111c and second NOT-gate circuit 112b are connected to an AND-gate circuit 113, which thus produces an output signal when it receives input signals concurrently from both the third Schmidt trigger circuit and second NOT-gate circuit. The second Schmidt trigger circuit 111b and this AND-gate circuit 113 are connected to an OR-gate circuit 114 so that an output signal is produced therefrom when it receives either or both of the output signals of the preceding circuits. The first Schmidt trigger circuit 111a and this OR-gate circuit 114 are connected through amplifiers 115a and 115b to the solenoid devices of the pressure control valve unit shown in FIG. 10 or 12. In this instance, the first Schmidt trigger circuit 111a and the OR-gate circuit 114 are connected to the second and first solenoid devices 71 and 70, respectively, if the shown speed-sensitive means is to be incorporated in the embodiment of FIG. 10 and if to be incorporated in the embodiment of FIG. 12, they may be connected conversely to the first and second solenoid devices 70 and 71, respectively, in order that the schedules indicated in Tables II and III may be achieved. Thus, the solenoid devices to be connected to the first Schmidt trigger circuit 111a and OR-gate circuit 114 are designated by reference characters $S_1$ and $S_2$, respectively, in FIG. 13 to avoid confusion between the first and second solenoid devices 70 and 71.

When, now, the vehicle-speed detector 108 detects a vehicle driving speed which is lower than $V_1$, then all the Schmidt trigger circuits 111a to 111d will be inoperative so that the NOT-gate circuits 112a and 112b produces the output signals. In the absence of the output signal from the third Schmidt trigger circuit 111c, the AND-gate circuit 113 remains inoperative and, in the presence of the output signal from the first NOT-circuit 112a under this condition, the OR-gate circuit 114 is operative. As a consequence, the solenoid device $S_2$ is energized and solenoid device $S_1$ is deenergized.

If the vehicle driving speed detected by the vehicle-speed detector 108 intervenes between $V_1$ and $V_2$, then only the second Schmidt trigger circuit 111b will become operative so that the first NOT-gate circuit 112a is inoperative and the second NOT-gate circuit is operative. The AND-gate circut 113 and accordingly the OR-gate circuit 114 thus produce no output signals. Neither of the solenoid devices $S_1$ and $S_2$ are therefore de-energized.

During the condition in which a vehicle driving speed intervening between $V_2$ and $V_3$ is detected by the vehicle-speed detector 108, the first, second and third Schmidt trigger circuits 111a, 111b and 111c are operative with the fourth Schmidt trigger circuit 111d inoperative. This causes the first NOT-gate circuit 112a to be inoperative and the second NOT-gate circuit to be operative, thereby establishing conditions in which the AND-gate circuit 113 and accordingly the OR-gate circuit 114 produce the output signals. Both of the solenoid devices $S_1$ and $S_2$ are consequently energized.

When the vehicle-speed detector 108 detects a vehicle driving speed which is higher than $V_3$, then all the Schmidt trigger circuits 111a to 111d will be operative so that both the first and second NOT-gate circuits 112a and 112b, respectively, are inoperative. The AND-gate circuit 113 and accordingly the OR-gate circuit 114 are consequently inoperative to cause the solenoid device $S_2$ de-energized and the solenoid device $S_1$ to be energized.

The results achieved in this manner are in agreement with the schedules indicated in Tables II and III as will be readily understood from examination of both where the solenoid devices $S_1$ and $S_2$ correspond to those 71 and 70 in Table II and to those 70 and 71 in Table III.

The ranges and/or the number of them may be selected as desired depending upon the operation requirements of the steering system. Where it is desired that the servo mechanism of the steering system be controlled in five or even more ranges, an appropriate number of additional elements or parts may be incorporated in the switch circuit 110 and in the pressure control valve unit and booster unit shown in FIGS. 10 and 12.

Also, a suitable arrangement may be made so that the reference vehicle driving speeds such as $V_1$, $V_2$ and $V_3$ are shifted between certain points depending upon acceleration and deceleration condition.

It should, furthermore, be noted that the schedules indicated in Tables I, II and III are merely by way of example so that the performance characteristics of the hydraulic-power control device according to the present invention may be varied in any desired manner through selection of such schedules.

What is claimed is:

1. A hydraulic-power control device for controlling hydraulic power to be supplied by a constant delivery pump to a hydraulic reaction chamber of a servo mechanism of a power-assisted steering system of a motor vehicle, which device comprises a steering-control valve unit which is responsive to steering resistance from front wheels of the motor vehicle and which is hydraulically connected to said pump for controlling the fluid pressure of the pump delivery to develop a steering-assistance fluid pressure in accordance with the steering resistance, speed-sensitive control means responsive to driving speed of the motor vehicle and producing an electric signal which is representative of the vehicle driving speed, a pressure control valve unit responsive to said steering-assistance fluid pressure and to said electric signal and producing a control signal which is related to said steering-assistance fluid pressure and said electric signal, and a booster unit hydraulically connected to said pump, reaction chamber and steering control valve unit for varying a fluid pressure to be directed to said reaction chamber in accordance with said control signal.

2. A hydraulic-power control device according to claim 1, in which said pressure control valve unit is hydromechanically connected to said booster unit and said steering-control valve unit for supplying to the booster unit a mechanical signal as said control signal in accordance with said steering-assistance fluid pressure and said electric signal.

3. A hydraulic-power control device according to claim 2, in which said booster unit comprises first and second balanced valves each having opposed, smaller and larger working faces, the smaller working faces being subjected to respective input pressures to the valves and the larger working faces being subjected to respective output pressures from the valves, the input pressure to the first balanced valve and the output pressure from the second balanced valves corresponding respectively to said pump delivery and steering-assistance fluid pressures, a first passageway for providing fluid communication between an input side of said first balanced valve and an output side of said second balanced valve through output and input sides of said first and second balanced valve respectively, said first passageway being provided with first and second adjustable flow restrictions intervening between the input and output sides of said first and second balanced valves respectively, said flow restrictions being adjustable by movements respectively of said first and second balanced valves due to differences between the input and output pressures acting upon the respective valves, and a second passageway providing interruptible fluid communication between the output sides of said first and second balanced valves for varying each of the output pressure from said first and second balanced valves in accordance with said mechanical signal which is supplied by said pressure control valve unit.

4. A hydraulic-power control device according to claim 3, in which said pressure control valve unit comprises first and second electromagnetic actuating means which are energized in accordance with said electric signal supplied from said speed-sensitive control means, and first and second fluid flow control valves operatively connected to said first and second electromagnetic actuating means, respectively, each for being actuated when the associated actuating means is energized, said first and second fluid flow control valves being positioned in association with said output sides of said first and second balanced valves of the booster unit for controlling said second passageway to vary each of the output pressures from said first and second balanced valves.

5. A hydraulic-power control device according to claim 1, in which said pressure control valve unit is hydraulically connected to said booster unit and said steering-control valve unit and supplying to said booster unit a signal fluid pressure as said control signal in accordance with said steering-assistance fluid pressure and said electric signal.

6. A hydraulic-power control device according to claim 5, in which said pressure control valve unit comprises a first valve member which is operable to cut off said steering-assistance fluid pressure to be directed to said booster unit when actuated, a second valve member which is operable to relieve said steering-assistance fluid pressure at a limited rate when actuated, and first and second electromagnetic actuating means connected to said speed-sensitive control means and respectively associated with the first and second valve members for actuating these valve members when energized, said first electromagnetic actuating means being energized when said electric signal represents a vehicle driving speed which is lower than a predetermined relatively low level and said second electromagnetic actuating means being actuated when said electric signal represents a vehicle driving speed higher than a relatively high level.

7. A hydraulic-power control device according to claim 6, in which said pressure control valve unit further comprises a first passageway which is hydraulically connected at its inlet side to said booster unit and at its outlet side to said steering-control valve unit through a flow restriction, said first valve member being positioned to shut-off said first passageway posterior to said flow restriction when actuated, and a second passageway leading at one end from said first passageway through a flow restriction and at the other opened to the outside of the pressure control valve unit, said second valve member being positioned to shut off said second passageway posterior to the flow restriction therein.

8. A hydraulic-power control device according to claim 6, in which speed-sensitive control means comprises a vehicle speed detector for detecting said driving speed of the motor vehicle and producing a signal voltage substantially proportional to the detected driving speed and an elecric control circuit which is connected at its input terminal to said vehicle speed detector and at its output terminal to said first and second electromagnetic actuating means for energizing the first electromagnetic means when said signal voltage represents said vehicle driving speed lower than said relatively low level and energizing the second electromagnetic means when said signal voltage represents said vehicle driving speed higher than said relatively high level.

9. A hydraulic-power control device according to claim 8, in which said electric control circuit comprises first and second Schmidt trigger circuits respectively having trigger levels corresponding to said relatively low and relatively high levels, said second Schmidt trigger circuit being connected to said second electromagnetic actuating means, and a NOT-gate circuit connected at its input terminal to said first Schmidt trigger circuit and at its output terminal to said first electromagnetic actuating means.

10. A hydraulic-power control device according to claim 5, in which said booster unit comprises a directional balanced valve having opposed, larger and smaller working faces, the larger working face being subjected to signal fluid pressure and the smaller working face being subjected to the pressure to said pump delivery, and a pressure-control passageway providing fluid communication between said pump and said steering-control valve unit through an adjustable flow restriction which is adjustable by movement of said directional balanced valve, said restriction being constricted or even closed when said balanced valve is moved by a force resulting from said signal fluid pressure acting upon said larger working face of the valve overcoming a force resulting from the pump delivery pressure acting upon said smaller working face of the valve for giving rise to an increase in the pump delivery pressure which is to be directed to said reaction chamber.

11. A hydraulic-power control device according to claim 10, in which said booster unit further comprises a valved passageway leading at one end from a pump side of said pressure-control passageway and opened at the other to the outside for draining off an excess of the pump delivery when the pump delivery pressure rises beyond a predetermined level.

12. A hydraulic-power control device according to claim 11, in which said booster unit further comprises a spring-loaded pressure relief valve interposed between ends of said valve passageway to bias the valved passageway to be closed and to open the valved passageway when a pressure difference thereacross exceeds a predetermined level.

13. A hydraulic-power control device according to claim 12, in which said pressure relief valve has self-maintaining characteristics by which the pressure relief valve is held at rest while said pressure difference is greater than a predetermined level.

14. A hydraulic-power control device according to claim 10, in which said booster unit further comprises a valved passageway leading at one end from a steering-control valve unit side of said pressure-control passageway and opened to the outside at its other end for draining off an excess of the steering-assistance fluid when the pressure thereof rises beyond a predetermined level.

15. A hydraulic-power control device according to claim 14, in which said booster unit further comprises a pressure spring-loaded pressure relief valve interposed between ends of said valve passageway to bias the valved passageway to be closed and to open the valved passageway when a pressure difference thereacross exceeds a predetermined level.

16. A hydraulic-power control device according to claim 15, in which said pressure relief valve has self-maintaining characteristics by which the pressure relief valve is held at rest while said pressure difference is greater than a predetermined level.

17. A hydraulic-power control device for controlling hydraulic power to be supplied from a constant delivery pump to a hydraulic reaction chamber of a servo mechanism of a power-assisted steering system of a motor vehicle, comprising a steering-control valve unit which is responsive to steering resistance from front wheels of the motor vehicle and which is hydraulically connected to said pump for controlling the fluid pressure of the pump delivery to develop a steering-assistance fluid pressure in accordance with the steering resistance, speed-sensitive control means which is responsive to a driving speed of said motor vehicle for producing an electric signal representative of the vehicle driving speed, a pressure control valve unit hydraulically connected to said steering-control valve unit and electrically connected to said speed-sensitive control means for producing a signal fluid pressure in accordance with the steering-assistance fluid pressure and said electric signal supplied therefrom, and a booster unit hydraulically connected to said pump, reaction chamber, steering-control valve unit and pressure control valve unit for multiplying a fluid pressure which is to be directed to said reaction chamber in accordance with said signal fluid pressure when said vehicle driving speed represented by said electric signal is higher than a predetermined level.

18. A hydraulic-power control device according to claim 17, in which said booster unit comprises a housing structure having formed therein fluid lines including a port communicating with said pump and said reaction chamber, a port communicating with said steering-control valve unit and with an input side of said pressure control valve unit, a port communicating with an output side of said pressure control valve unit and a bore into which all the said ports are open, and a directional balanced valve axially slidably received in said bore and having a land which has a smaller working face sub-jected to the pump delivery pressure through said port communicating with said pump and a larger working face subjected to said signal fluid pressure through said port communicating with said output side of said pressure control valve unit, said balanced valve defining in said bore an adjustable orifice which is closed and opened as said balanced valve is moved due to difference between opposing forces resulting from the fluid pressure acting upon the smaller and larger working faces of said land, said orifice providing communication between the ports communicating respectively with said pump and said steering-control valve unit when opened.

19. A hydraulic-power control device according to claim 18, in which said booster unit further comprises first and second bypass passageway each opened at one end to the outside of said housing structure, said first bypass passageway bypassing said orifice and said second bypass passageway leading from said port communicating with said steering-control valve unit, and first and second spring-loaded pressure relief valves disposed in said first and second bypass passageways respectively, each of said pressure relief valves being biased to close the associated bypass passage and moved to open the bypass passageway when the fluid pressure obtaining anterior thereto rises beyond a predetermined level for draining off an excess of the fluid pressure.

20. A hydraulic-power control device according to claim 17, in which said pressure control valve unit comprises a housing structure having formed therein a first fluid passage having an inlet port communicating with an output side of said booster unit and an outlet port communicating with an input side of said booster unit, a flow restriction intervening between the inlet and outlet ports of said first fluid passage and a second fluid passage communicating through a flow restriction with said first fluid passage posterior to the flow restriction therein and opened to the outside of said housing structure, first and second flow shut-off valves projecting respectively into first and second fluid passages posterior to the respective flow restrictions and biased to open said first and second fluid passages, and actuating means associated with said flow shut-off valves and electrically connected to said speed-sensitive control means for moving each of said shut-off valves in accordance with said electric signal.

21. A hydraulic-power control device according to claim 20, in which said actuating means comprises first and second solenoid devices respectively having plungers engaging with said first and second flow shut-off valves and having retracted positions when the respective solenoid devices are de-energized, said plungers being protruded when the respective solenoid devices are energized by said electric signal for moving the associated flow shut-off valves to close said first and second fluid passages independently of each other.

22. A hydraulic-power control device according to claim 21, in which said speed-sensitive control means comprises a vehicle-pseed detector responsive to the driving speed of the motor vehicle and producing a d.c. signal voltage proportional to the detected vehicle driving speed, converting means for converting said d.c. signal voltage into an a.c. signal voltage, and switch means which is connected to said converting means and which is operable to produce said electric signal to energize said first solenoid device only when said signal voltage represents a vehicle driving speed lower than a predetermined relatively low level and to energize said second solenoid device only when said signal voltage represents a vehicle driving speed which is higher than a predetermined relatively high level.

23. A hydraulic-power control device according to claim 22, in which said switch means comprises first and second Schmidt trigger circuits having trigger levels respectively corresponding to said predetermined relatively low and relatively high levels, said second Schmidt trigger circuit being connected to said second solenoid device, and a NOT-gate circuit connected between said first Schmidt trigger circuit and said first solenoid device.

24. A hydraulic-power control device for controlling hydraulic power to be supplied from a constant delivery pump to a hydraulic reaction chamber of a servo mechanism of a power-assisted steering system of a motor vehicle, comprising a steering-control valve unit which is responsive to steering resistance from front wheels of the motor vehicle and which is hydraulically connected to said pump for controlling the pump delivery pressure to develop steering-assistance fluid pressure in accordance with said steering resistance, speed-sensitive control means which is responsive to a driving speed of said motor vehicle for producing an electric signal representative of the vehicle driving speed, a pressure control valve unit hydromechanically connected to said steering-control valve unit and electrically connected to said speed-sensitive control means for producing a mechanical signal in accordance with said electric signal, and a booster unit hydraulically connected to said pump, reaction chamber and steering-control valve unit and hydromechanically connected to said pressure control valve unit for multiplying a fluid pressure which is to be directed to said reaction chamber when said vehicle driving speed represented by said electric signal is higher than a predetermined level.

25. A hydraulic-power control device according to claim 24, in which said booster unit comprises a housing structure having formed therein a port communciating with said pump and reaction chamber, a port communicating with said steering-control valve unit, a first bore anteriorly communicating with said port communicating with said pump and reaction chamber, a second bore posteriorly communicating with said port communicating with said steering-control valve unit, said first and second bores communicating with each other through an intermediate passage, a first pressure acting chamber anteriorly communicating with said port communicating with said pump and posteriorly communicating with said intermediate passage, a second pressure acting chamber communicating anteriorly with said first pressure acting chamber and said intermediate passage and posteriorly with said port communicating with said steering-control valve unit and first and second directional balanced valves respectively axially slidably received in said first and second bores, each of said balanced valves having a land and a constriction defining an adjustable flow restriction in the associated bore, the land of said balanced valve having a smaller working face subjected to the pump delivery pressure and a larger working face subjected to a fluid pressure in said first pressure acting chamber and the land of said second balanced valve having a smaller working face subjected to a fluid pressure in said intermediate passage and a larger working face subjected to a fluid pressure in said second pressure working chamber the adjustable flow restriction in said first bore intervening between said port communicating with said pump and said intermediate passage and the adjustable flow restriction in said second bore intervening between said intermediate passage and said port communicating with said steering-control valve unit, each of the adjustable flow restrictions being closed and opened as the associated balanced valve is axially moved due to difference between opposing forces resulting from the fluid pressures acting on both working faces of its land, said pressure control valve comprising first and second spring-loaded fluid shut-off valves projecting toward said first and second pressure acting chambers, respectively, said first fluid shut-off valve being axially movable between postions establishing and interrupting fluid communication between said first pressure acting chamber and said port communicating with said pump and biased to establish such communication and said second fluid shut-off valve being axially movable between positions establishing and interrupting fluid communication between said second pressure acting chamber and said port communicating with said steering-control valve and biased to interrupt such commnication, and first and second valve actuating means associated with said first and second fluid shut-off valves and electrically connected to said speed-sensitive control means for moving said first fluid shut-off valve to interrupt said fluid communication and moving said second fluid shut-off valve to establish said fluid communication when energized by said electric signal.

26. A hydraulic-power control device according to claim 24, in which said booster unit comprises a housing structure having formed therein a port communicating with said pump and reaction chamber, a port communicating with said steering control valve unit, a first bore anteriorly communicating with said port communicating with the pump and reaction chamber, a second bore posteriorly communicating with said port communicating with said steering-control valve unit, said first and second bores communicating with each other through an intermediate passage, first and second pressure acting chambers communicating respectively with said intermediate passage and said port communicating with said steering-control valve unit, and a drain passage having one end opened to the outside of said housing structure and branch ends disposed adjacent said first and second pressure acting chambers, and first and second directional balanced valves respectively axially slidably received in said first and second bores, each of said balanced valves having a land and a constriction defining an adjustable flow restriction in the associated bore, the land of said first balanced valve having a smaller working face subjected to the pump delivery pressure and a larger working face subjected to the fluid pressure in said first pressure acting chamber and the land of said second balanced valve having a smaller working face subjected to the fluid pressure in said intermediate passage and a larger working face subjected to the steering-assistance fluid pressure in said port communicating with said steering-control valve unit, the adjustable flow restriction in said first bore intervening between said port communicating with said pump and said intermediate passage and the adjustable flow restriction in said second bore intervening between said intermediate passage and said port communicating with said steering-control valve unit, each of the adjustable flow restrictions being closed and opened as the associated balanced valve is axially moved due to difference between opposing faces resulting from the fluid pressures acting upon both working faces of its land, said pressure control valve unit comprising first and second spring-loaded fluid shut-off valves projecting toward said first and second pressure acting chambers and axially movable between positions to close and open the chambers, respectively, each of said fluid shut-off valves being formed with a fluid passage having one end open to the associated pressure acting chamber and the other end opened and positioned to be in alignment with each of said branch ends of said drain passage when the fluid shut-off valve is in a position to close the associated pressure acting chamber, said first fluid shut-off valve being biased to open said first pressure acting chamber and said second fluid shut-off valve being biased to close said second pressure acting chamber, and first and second valve actuating means associated with said first and second fluid shut-off valves and electrically connected to said speed-sensitive control means for moving said first fluid shut-off valve to a position to close said first pressure acting chamber and moving said second fluid shut-off valve to open said second pressure acting chamber when energized by said electric signal.

27. A hydraulic-power control device according to claim 26, in which said booster unit further comprises first and second bypass passageways which are opened each at one end to the outside of said housing structure, said first bypass passageway bypassing said first adjustable flow restriction and said second bypass passageway leading from said port communicating with said steering-control valve unit, and first and second spring-loaded pressure relief valves disposed respectively in said first and second bypass passageways, each of said pressure relief valves being biased to close the associated bypass passageway and moved to open the passageway when the fluid pressure obtaining anterior thereto rises beyond a predetermined level for draining off an excess of the fluid pressure therefrom.

28. A hydraulic-power control device according to claim 26, in which said speed sensitive control means comprising a vehicle-speed detector responsive to the driving speed of the motor vehicle and producing a d.c. signal voltage proportional to the detected vehicle driving speed, converting means for converting said d.c. signal voltage into an a.c. signal voltage, and switch means which is connected to said converting means and which is operable to produce said electric signal to selectively energize said first and second valve actuating means in accordance with said a.c. signal voltage.

29. A hydraulic-power control device according to claim 28, in which said switch means comprises first, second, third and fourth Schmidt trigger circuits connected to said converting means, said first and third Schmidt trigger circuits having a common trigger level which is in agreement with a predetermined reference voltage, said second Schmidt trigger circuit having a trigger level lower than said common trigger level and said fourth Schmidt trigger circuit having a trigger level which is higher than said common trigger level, said first Schmidt trigger circuit being connected to said second valve actuating means, first and second NOT-gate circuits connected to said second and fourth Schmidt trigger circuits, an AND-gate circuit connected to said third Schmidt trigger circuit and said second NOT-gate circuit, and an OR-gate circuit connected at its input terminal to said first NOT-gate circuit and said AND-gate circuit and at its output terminal to said first valve actuating means.

\* \* \* \* \*